United States Patent
Tanaka et al.

(10) Patent No.: US 10,351,362 B2
(45) Date of Patent: Jul. 16, 2019

(54) TRANSFER APPARATUS AND ARTICLE TAKING-OUT METHOD

(71) Applicant: Kabushiki Kaisha Toshiba, Minato-ku (JP)

(72) Inventors: Junya Tanaka, Tokyo (JP); Kazuo Watabe, Yokohama (JP); Akihito Ogawa, Fujisawa (JP); Hideichi Nakamoto, Tokyo (JP); Takafumi Sonoura, Yokohama (JP); Haruna Eto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 41 days.

(21) Appl. No.: 14/940,452

(22) Filed: Nov. 13, 2015

(65) Prior Publication Data
US 2016/0137435 A1 May 19, 2016

(30) Foreign Application Priority Data

Nov. 13, 2014 (JP) .................................. 2014-230883

(51) Int. Cl.
*B65G 69/00* (2006.01)
*B65G 65/02* (2006.01)
(Continued)

(52) U.S. Cl.
CPC ............ *B65G 65/02* (2013.01); *B25J 9/0093* (2013.01); *B25J 9/023* (2013.01); *B25J 9/026* (2013.01);
(Continued)

(58) Field of Classification Search
CPC .................................... B60P 1/36; B65H 3/50
(Continued)

(56) References Cited

U.S. PATENT DOCUMENTS

| 5,265,712 A | 11/1993 | Krieg |
| 5,524,747 A | 6/1996 | Wohlfahrt et al. |

(Continued)

FOREIGN PATENT DOCUMENTS

| CN | 102699790 A | 10/2012 |
| DE | 10 2007 054 867 A1 | 5/2009 |

(Continued)

OTHER PUBLICATIONS

Extended European Search Report dated Mar. 23, 2016 in European Application No. 15194313.1.

*Primary Examiner* — Saul Rodriguez
(74) *Attorney, Agent, or Firm* — Oblon, McClelland, Maier & Neustadt, L.L.P.

(57) ABSTRACT

According to an embodiment, a transfer apparatus includes a gripper, a first driving mechanism, an elastic passive joint part, a conveyor, a second driving mechanism, and base. The gripper grips an article. The first driving mechanism linearly moves the gripper in at least two directions including a first direction and a second direction intersecting with the first direction. The elastic passive joint part is interposed between the gripper and the first driving mechanism, and operates in accordance with an operation of the gripper. The conveyor conveys the article. The second driving mechanism linearly moves the conveyor in the at least two directions, and is connected to the conveyor. The base supports the first driving mechanism and the second driving mechanism.

20 Claims, 19 Drawing Sheets

(51) Int. Cl.
    *B25J 9/00*     (2006.01)
    *B25J 9/02*     (2006.01)
    *B25J 15/00*     (2006.01)
    *B25J 17/02*     (2006.01)
    *B65G 47/91*     (2006.01)
    *B65G 61/00*     (2006.01)
    *B65G 65/00*     (2006.01)
    *B65G 37/00*     (2006.01)

(52) U.S. Cl.
    CPC ....... *B25J 15/0014* (2013.01); *B25J 17/0208* (2013.01); *B65G 37/00* (2013.01); *B65G 47/914* (2013.01); *B65G 61/00* (2013.01); *B65G 65/00* (2013.01)

(58) Field of Classification Search
    USPC .......................................... 414/398, 528, 797
    See application file for complete search history.

(56) References Cited

U.S. PATENT DOCUMENTS

| | | | |
|---|---|---|---|
| 5,683,222 A | 11/1997 | Ingelhag | |
| 8,465,250 B2 * | 6/2013 | Johnsen | B65G 21/14 414/264 |
| 9,434,558 B2 * | 9/2016 | Criswell | B25J 5/007 |
| 2008/0298940 A1 * | 12/2008 | Cleasby | B60P 1/02 414/398 |
| 2014/0341695 A1 * | 11/2014 | Girtman | B65G 59/02 414/797 |

FOREIGN PATENT DOCUMENTS

| | | |
|---|---|---|
| DE | 10 2011 115 951 A1 | 4/2013 |
| JP | 53-87464 A | 8/1978 |
| JP | 5-105235 A | 4/1993 |
| JP | 6-87533 A | 3/1994 |
| JP | 6-144574 A | 5/1994 |
| JP | 6-144575 A | 5/1994 |
| JP | 6-171761 A | 6/1994 |
| JP | 6-336337 A | 12/1994 |
| JP | 7-53044 A | 2/1995 |
| JP | 7-69455 A | 3/1995 |
| JP | 7-157089 A | 6/1995 |
| JP | 2010-143651 A | 7/2010 |
| JP | 2014-43322 A | 3/2014 |
| WO | WO 2016/033172 A1 | 3/2016 |

\* cited by examiner

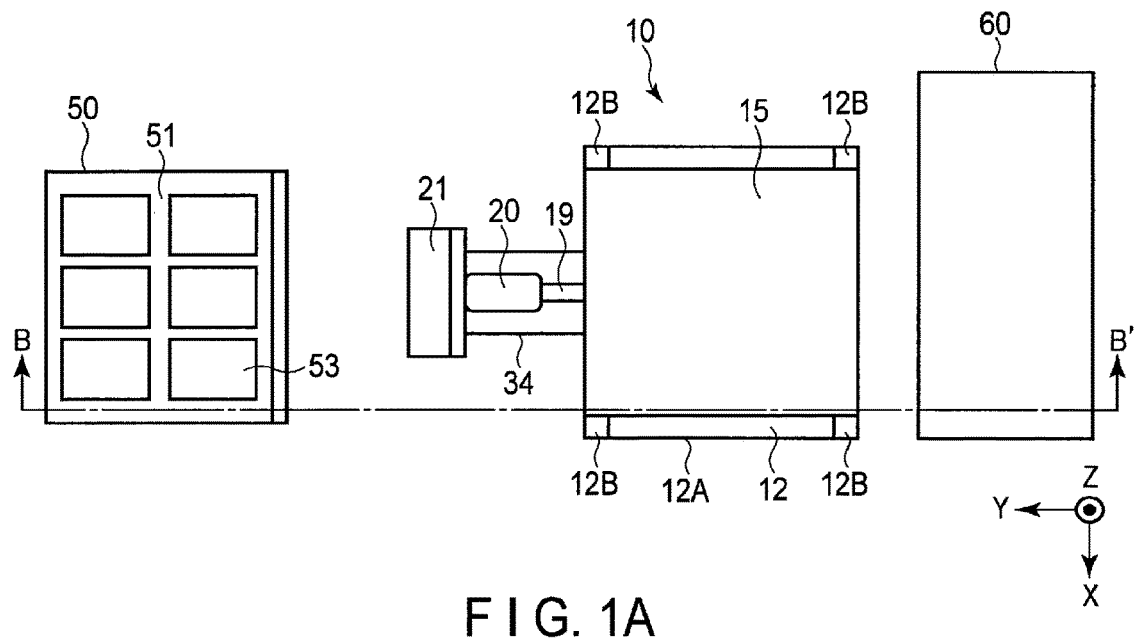
F I G. 1A
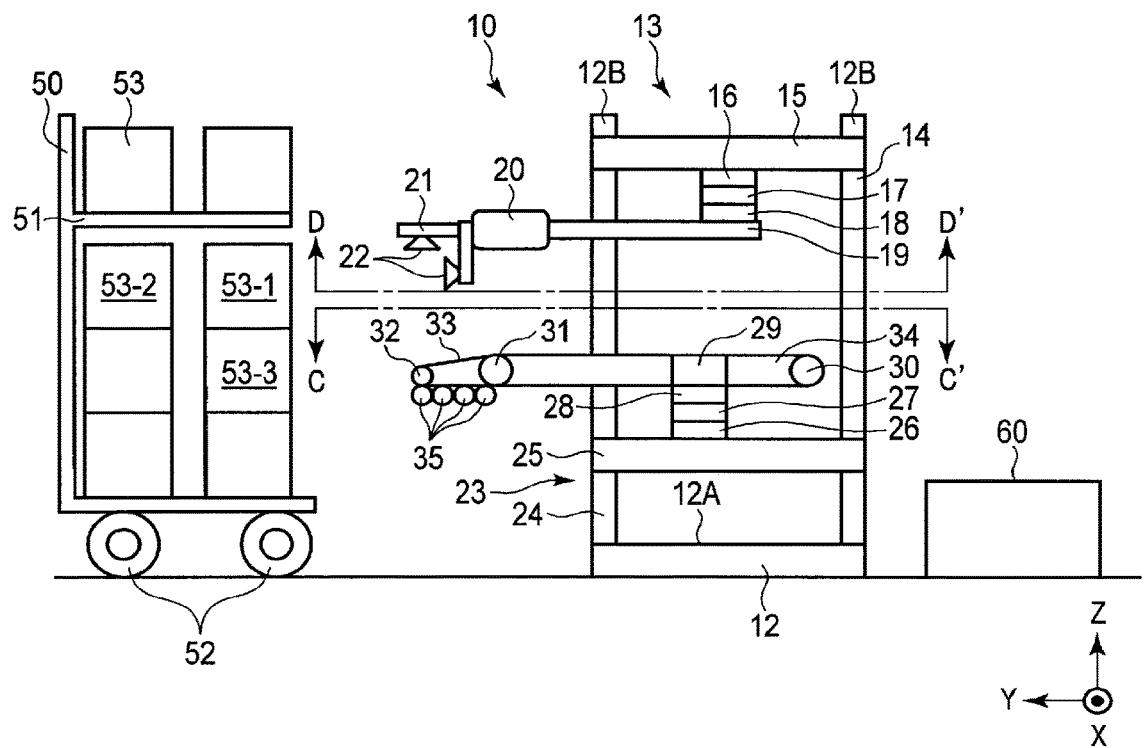
F I G. 1B

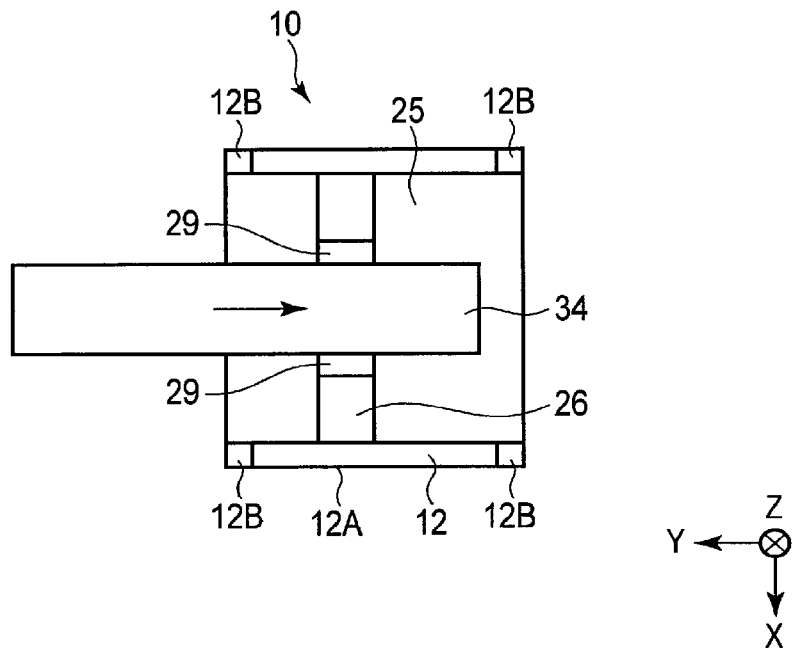
F I G. 1C
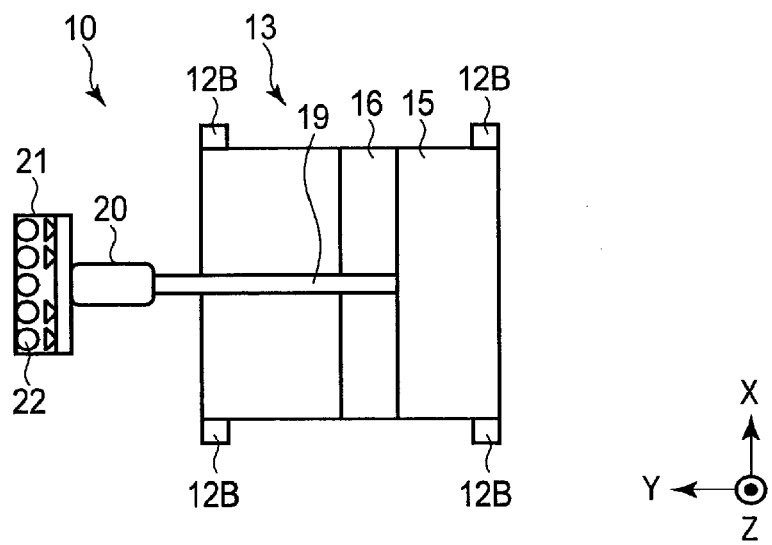
F I G. 1D

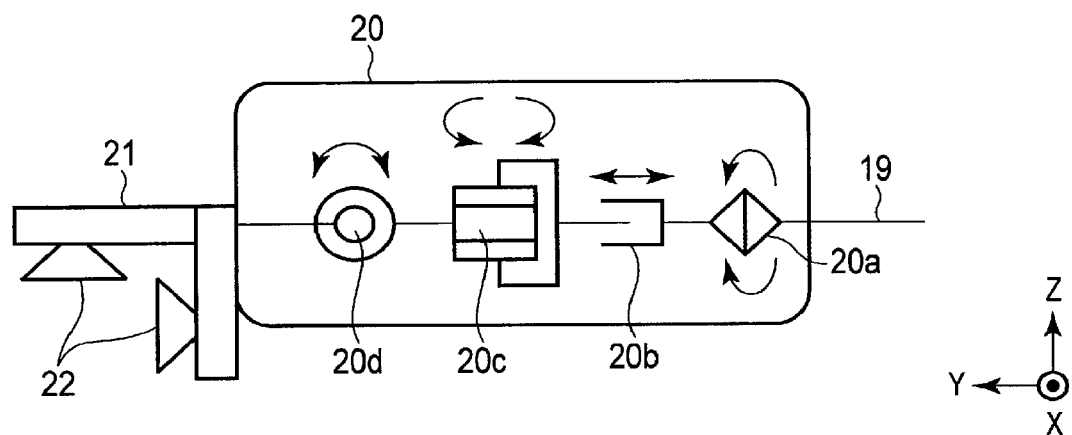
F I G. 2
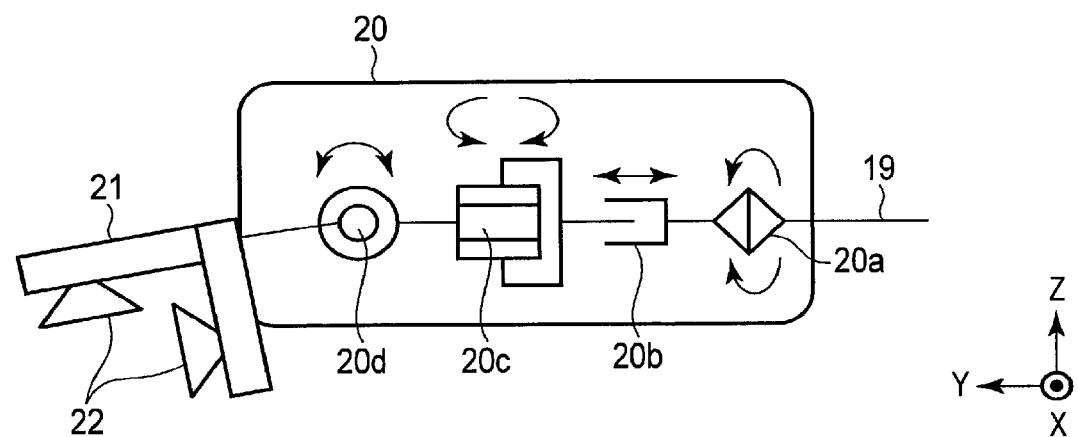
F I G. 3

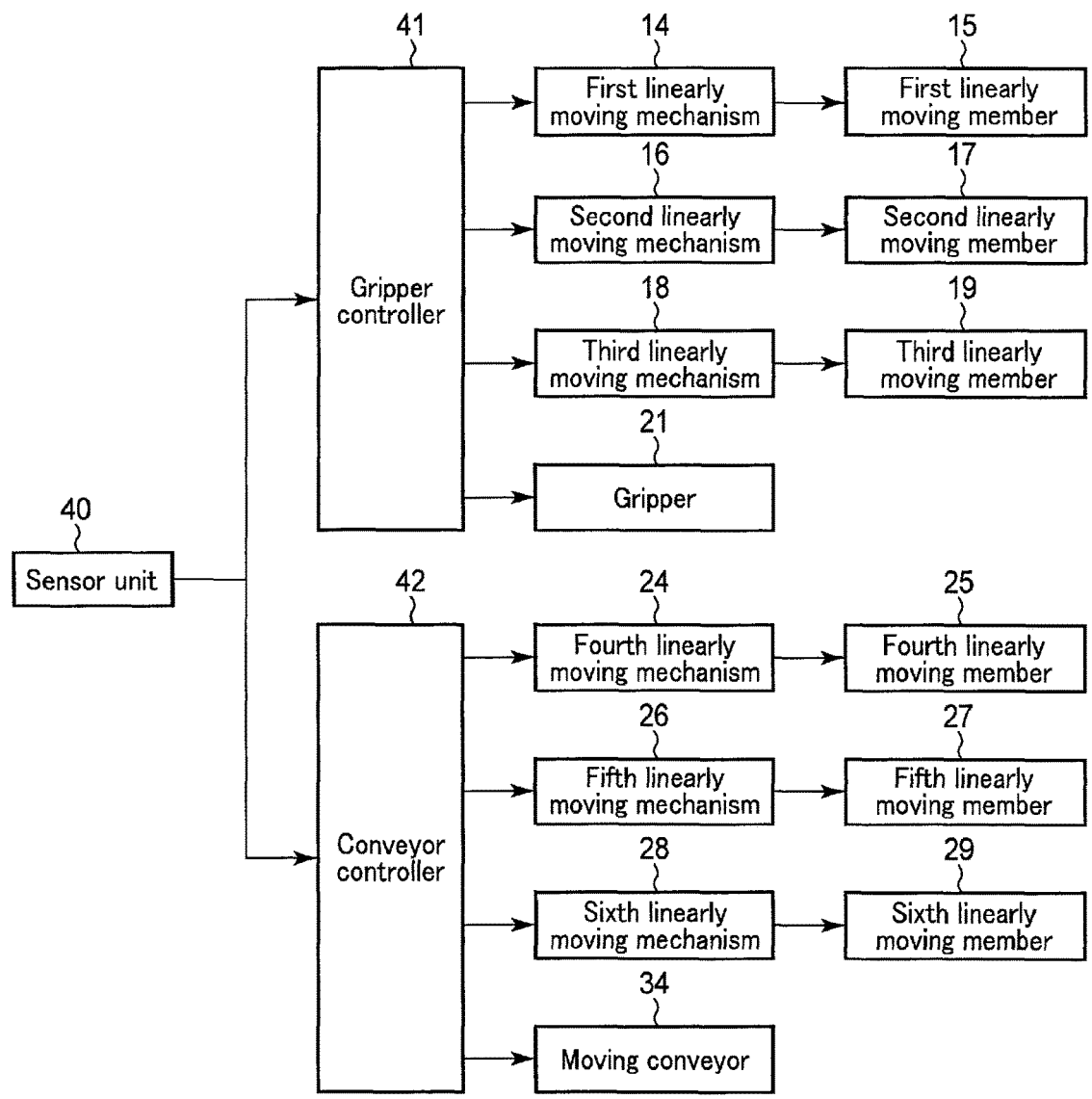
F I G. 5

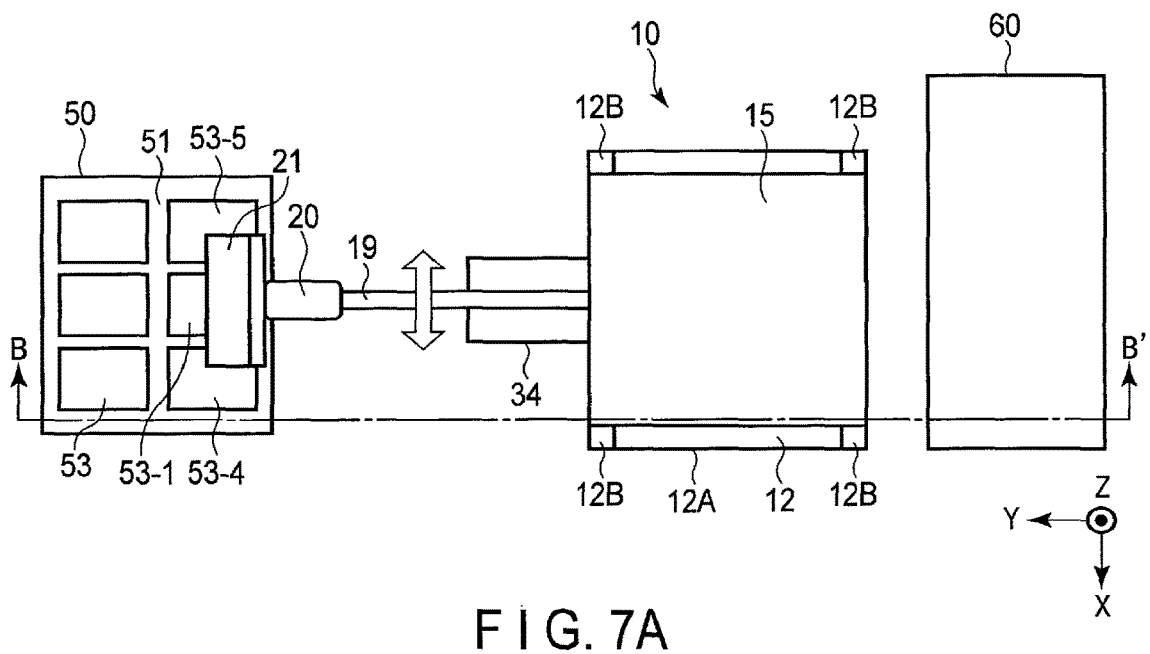
F I G. 7A
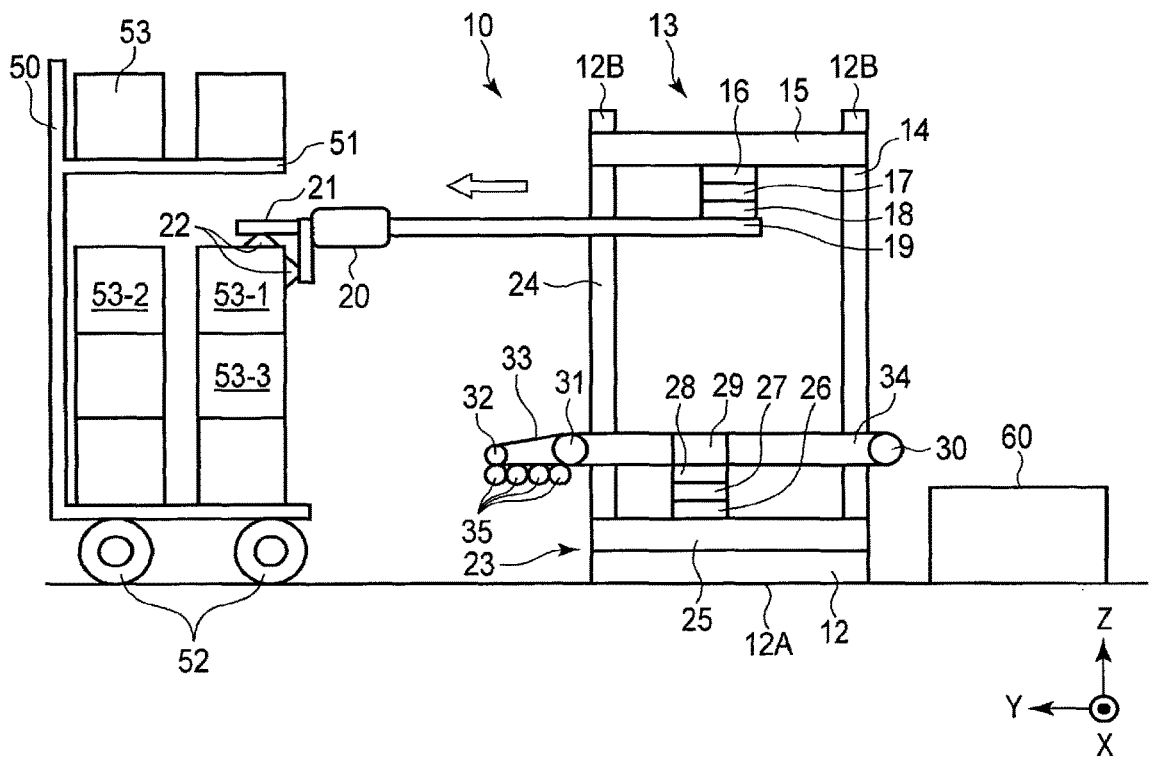
F I G. 7B

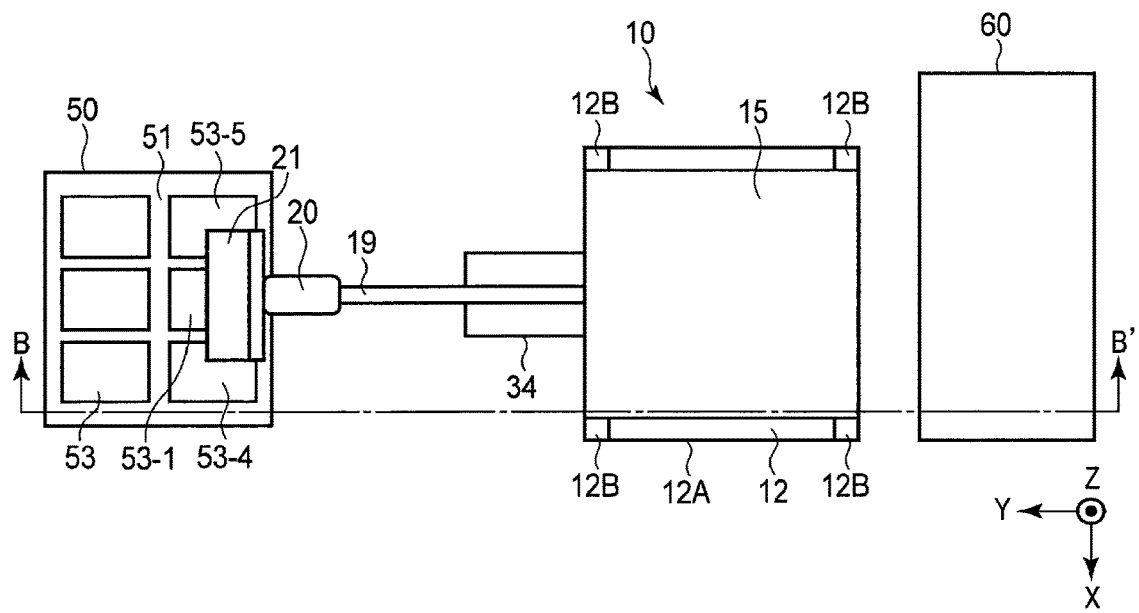
F I G. 8A
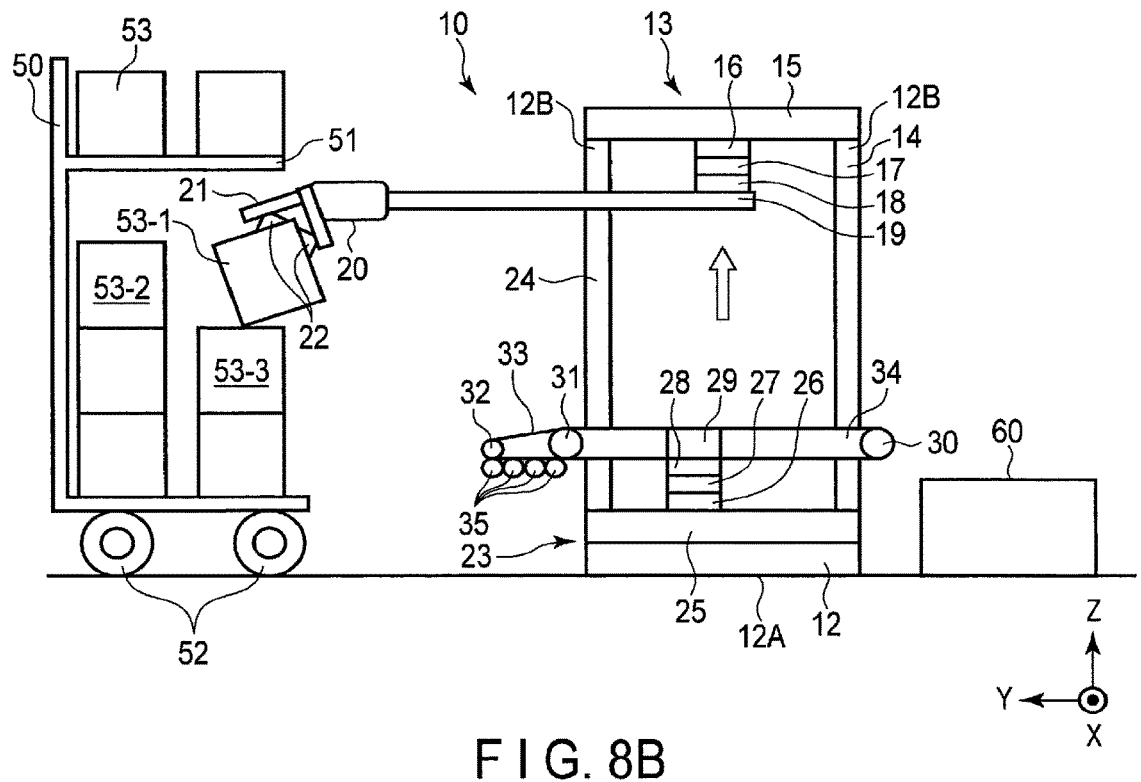
F I G. 8B

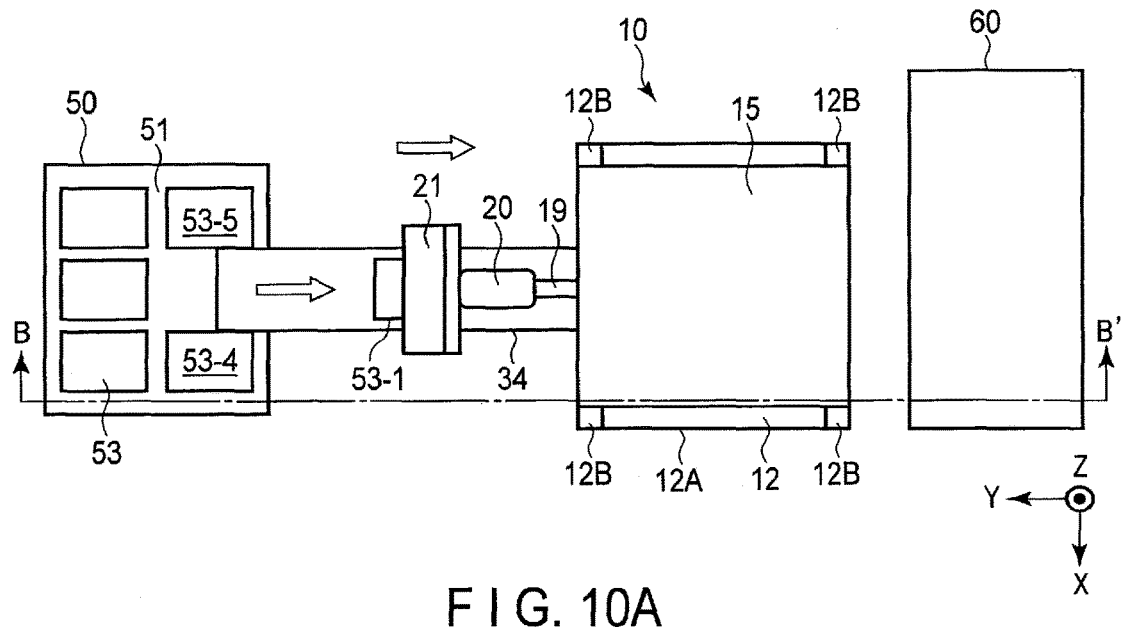
F I G. 10A
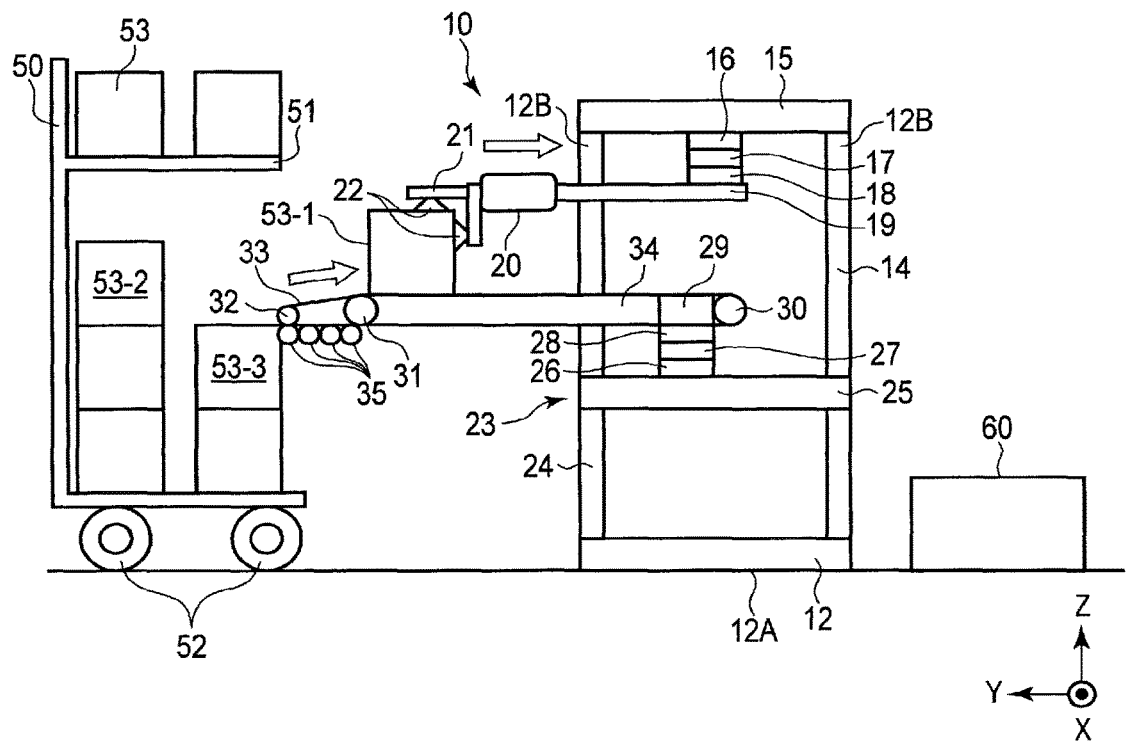
F I G. 10B

TRANSFER APPARATUS AND ARTICLE TAKING-OUT METHOD

CROSS-REFERENCE TO RELATED APPLICATIONS

This application is based upon and claims the benefit of priority from Japanese Patent Application No. 2014-230883, filed Nov. 13, 2014, the entire contents of which are incorporated herein by reference.

FIELD

Embodiments described herein relate generally to a transfer apparatus and an article taking-out method.

BACKGROUND

In the field of distribution, as the supply chain is now globalized and laborers are growing old, the manpower for handling loading/unloading operations is likely to be in short supply, while the distribution quantities are increasing. Therefore, in recent years, a transfer apparatus has come into wide use to transfer an article (also called an object, a package, or a load). In the transfer apparatus, it is required to stably handle the article that is difficult to secure by the conventional vacuum gripping device, such as an article with irregular surfaces, an article which is likely to be deformed, an article wrapped in paper, and an inclined article.

As the transfer apparatus, an orthogonal mechanism robot and an articulated arm robot are known. The orthogonal mechanism robot and the articulated arm robot typically tend to be increased in size. For example, in a case where the orthogonal mechanism robot grips the article from the upside, it is required to use a vertically long arm Therefore, in a case where there is a spatial limitation such that the height of a roof is low, the orthogonal mechanism robot cannot be installed.

In addition, even in an articulated arm robot, redundant joints tend to be required to avoid the existing machine in a case where the article is gripped from the upside. Furthermore, in a case where the articles are stacked in a rectangular shape in a box pallet provided with an intermediate shelf, the further redundant joints are required when the article near the intermediate shelf in the box pallet is taken out. Therefore, the robot is increased in size and in cost.

BRIEF DESCRIPTION OF THE DRAWINGS

FIG. 1A is a top view illustrating an outline of a transfer apparatus according to a first embodiment;

FIG. 1B is a cross-sectional view of the transfer apparatus taken along line B-B' illustrated in FIG. 1A;

FIG. 1C is a cross-sectional view of the transfer apparatus taken along line C-C' illustrated in FIG. 1B;

FIG. 1D is a cross-sectional view of the transfer apparatus taken along line D-D' illustrated in FIG. 1B;

FIG. 2 is a side view illustrating an exemplary structure of an elastic passive joint part illustrated in FIG. 1A in the degree of freedom arrangement;

FIG. 3 is a side view illustrating another exemplary structure of the elastic passive joint part illustrated in FIG. 1A in the degree of freedom arrangement;

FIG. 5 is a block diagram illustrating a control system of the transfer apparatus illustrated in FIG. 1A;

FIG. 7A is a top view illustrating the example of the operation of the transfer apparatus illustrated in FIG. 1;

FIG. 7B is a cross-sectional view taken along line B-B' illustrated in FIG. 7A;

FIG. 8A is a top view illustrating the example of the operation of the transfer apparatus illustrated in FIG. 1;

FIG. 8B is a cross-sectional view taken along line B-B' illustrated in FIG. 8A;

FIG. 10A is a top view illustrating the example of the operation of the transfer apparatus illustrated in FIG. 1;

FIG. 10B is a cross-sectional view taken along line B-B' illustrated in FIG. 10A;

DETAILED DESCRIPTION

Figure 4A:
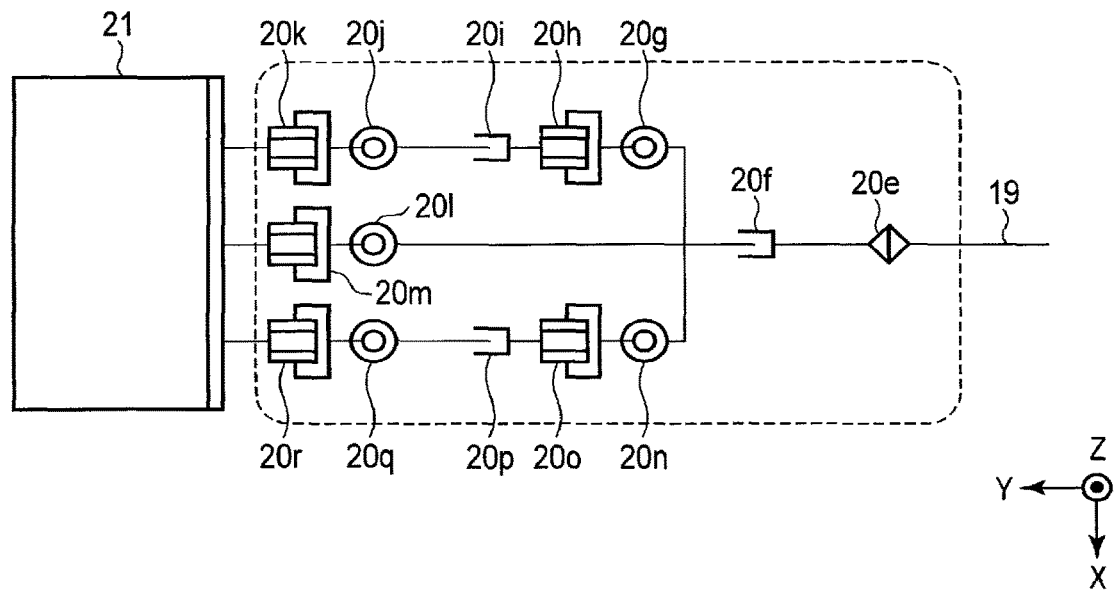
FIG. 4A is a top view illustrating still another exemplary structure of the elastic passive joint part illustrated in FIG. 1A in the degree of freedom arrangement.

According to an embodiment, a transfer apparatus includes a gripper, a first driving mechanism, an elastic passive joint part, a conveyor, a second driving mechanism, and base. The gripper grips an article. The first driving mechanism linearly moves the gripper in at least two directions including a first direction and a second direction intersecting with the first direction. The elastic passive joint part is interposed between the gripper and the first driving mechanism, and operates in accordance with an operation of the gripper. The conveyor conveys the article. The second driving mechanism linearly moves the conveyor in the at least two directions, and is connected to the conveyor. The base supports the first driving mechanism and the second driving mechanism.

Hereinafter, embodiments will be described with reference to the drawings.

First Embodiment

FIG. 1A is a top view schematically illustrating a transfer apparatus 10 according to a first embodiment. FIG. 1B is a cross-sectional view of the transfer apparatus 10 taken along line B-B' illustrated in FIG. 1A, FIG. 1C is a cross-sectional view of the transfer apparatus 10 taken along line C-C' illustrated in FIG. 1B, and FIG. 1D is a cross-sectional view of the transfer apparatus 10 taken along line D-D' illustrated in FIG. 1B. In FIGS. 1A to 1D, an XYZ orthogonal coordinate system is attached for the sake of explanation.

As illustrated in FIG. 1A, a box pallet 50 is positioned in the front of the transfer apparatus 10, and a conveyor 60 is positioned in the rear of the transfer apparatus 10. As illustrated in FIG. 1B, an intermediate shelf 51 is provided in the box pallet 50, and articles 53 are stacked and stored in the box pallet 50. In the present embodiment, the box pallet 50 includes wheels 52 to be capable of moving which may be fixed by a wheel stopper, and the transfer apparatus 10 and the conveyor 60 are disposed on the ground. Alternatively, the transfer apparatus 10 may be movably provided. For example, the transfer apparatus 10 may be provided with the wheels, or may move along rails laid on the ground.

The transfer apparatus 10 transfers the article 53 stored in the box pallet 50 to the conveyor 60. The transfer apparatus 10 includes a base 12, a first driving mechanism 13, an elastic passive joint part 20, a gripper 21, a second driving mechanism 23, a moving conveyor 34, and a passive roller 35. The first driving mechanism 13, the elastic passive joint part 20, and the gripper 21 are collectively called an arm part, and the second driving mechanism 23, the moving conveyor 34, and the passive roller 35 are collectively called a transfer part. The arm part is positioned above the transfer part. The transfer apparatus 10 takes out the article 53 from the box pallet 50 using the arm part and the transfer part, and transports the taken-out article to the conveyor 60.

The gripper 21 grips the article 53 to take out the article 53 from the box pallet 50. The first driving mechanism 13 linearly moves the gripper 21 in at least two directions (for example, three directions). The first driving mechanism 13 is supported by the base 12. The elastic passive joint part 20 is interposed between the gripper 21 and the first driving mechanism 13. When external force is applied, the elastic passive joint part 20 makes a passive and elastic move by rotating the joint and expanding or contracting the linearly moving element along the force-receiving direction. The movement is called "simulating operation".

The moving conveyor 34 conveys, to the conveyor 60, the article 53 taken out from the box pallet 50. The second driving mechanism 23 is connected to the moving conveyor 34, and linearly moves the moving conveyor 34 in at least two directions (for example, three directions). The second driving mechanism 23 is supported by the base 12. The passive roller 35 is an example of a passive rotational element which passively rotates, and is disposed on the lower side (a rear surface side) of the moving conveyor 34.

The structure of the transfer apparatus 10 according to the present embodiment will be described in detail.

The base 12 includes, for example, a bottom part 12A coming in contact with the ground, and a plurality of vertical members 12B extending in the vertical direction from the bottom part 12A. The vertical direction corresponds to the Z axis direction. In the example illustrated in FIG. 1B, four vertical members 12B are provided at four corners of the bottom part 12A in a rectangular pipe.

The first driving mechanism 13 includes a first linearly moving member 15, a second linearly moving member 17, and a third linearly moving member 19. The first linearly moving member 15 is movably supported by the base 12 in the vertical direction. For example, a first linearly moving mechanism 14 is provided in one of the vertical members 12B to drive the first linearly moving member 15 in the vertical direction, and guide rails extending in the vertical direction are provided in the remaining three vertical members 12B. The first linearly moving member 15 is driven by the first linearly moving mechanism 14 so as to ascend or descend. The ascending corresponds to movement in the +Z direction, and the descending corresponds to movement in the −Z direction.

The second linearly moving member 17 is movably supported by the first linearly moving member 15 in the left-right direction. In the present embodiment, the left-right direction is perpendicular to the vertical direction. The left-right direction corresponds to the X-axis direction. For example, a second linearly moving mechanism 16 is provided in the first linearly moving member 15 to drive the second linearly moving member 17 in the left-right direction. The second linearly moving member 17 is driven by the second linearly moving mechanism 16 so as to move onto the left (the +X direction) or the right (the −X direction).

The third linearly moving member 19 is movably supported by the second linearly moving member 17 in the front-back direction. In this embodiment, the front-back direction is perpendicular to the vertical direction and the left-right direction. The front-back direction and the left-right direction are parallel to a horizontal plane. The front-back direction is also called a first horizontal direction, and the left-right direction is also called a second horizontal direction. The front-back direction corresponds to the Y-axis direction. For example, a third linearly moving mechanism 18 is provided in the second linearly moving member 17 to drive the third linearly moving member 19 in the front-back direction. The third linearly moving member 19 is driven by the third linearly moving mechanism 18 so as to advance or retreat. The advancing corresponds to movement in the +Y direction (that is, a direction toward the article 53 to be gripped), and the retreating corresponds to movement in the −Y direction.

The elastic passive joint part 20 is supported by the third linearly moving member 19. Specifically, the second linearly moving member 17 is connected to the base end of the third linearly moving member 19, and the elastic passive joint part 20 is connected to the leading end of the third linearly moving member 19. Thus, the elastic passive joint part 20 is supported by the base 12 through the first linearly moving member 15, the second linearly moving member 17, and the third linearly moving member 19. The elastic passive joint part 20 is driven by the first linearly moving member 15 to move in the vertical direction, driven by the second linearly moving member 17 to move in the left-right direction, and driven by the third linearly moving member 19 to move in the front-back direction. The elastic passive joint part 20 will be described below in detail.

The gripper 21 is supported by the elastic passive joint part 20. Specifically, the third linearly moving member 19 is connected to the base end of the elastic passive joint part 20, and the gripper 21 is connected to the leading end of the elastic passive joint part 20. Thus, the gripper 21 is supported by the base 12 through the first linearly moving member 15, the second linearly moving member 17, the third linearly moving member 19, and the elastic passive joint part 20. The gripper 21 is driven by the first linearly moving member 15 to move in the vertical direction, driven by the second linearly moving member 17 to move in the left-right direction, and driven by the third linearly moving member 19 to move in the front-back direction. Therefore, the leading end of the gripper 21 can reach over the entire range of the box pallet 50.

In the present embodiment, the gripper 21 grips the upper surface edge portion of the article 53. Specifically, the gripper 21 includes an L-shaped member with two mutually perpendicular surfaces (referred to as gripping surfaces), and grips the article 53 in a state where the two surfaces face the upper surface and the front surface of the article 53. The front surface of the article 53 is a side surface facing the transfer apparatus 10 among the side surfaces of the article 53. In a case where the gripper 21 is of an suction type, suction pads 22 are provided on the gripping surfaces as illustrated in FIG. 1D, and the article 53 is gripped by vacuum suction. In addition, in a case where the gripper 21 is an adhesive type, adhesive sheets are provided on the gripping surfaces, and the article 53 is gripped by adhesion.

At the gripping surface of the gripper 21, a contact sensor or a reflective sensor may be provided. The contact sensor or the reflective sensor can be used to detect a gripping state of the gripper 21.

As illustrated in FIG. 1B, the second driving mechanism 23 includes a fourth linearly moving member 25, a fifth linearly moving member 27, and a sixth linearly moving member 29. The fourth linearly moving member 25 is movably supported by the base 12 in the vertical direction. For example, a fourth linearly moving mechanism 24 is provided in one of the vertical members 12B to drive the fourth linearly moving member 25 in the vertical direction, and guide rails are provided in the remaining three vertical members 12B along the vertical direction. The fourth linearly moving member 25 is driven by the fourth linearly moving mechanism 24 so as to ascend or descend.

The fifth linearly moving member 27 is movably supported by the fourth linearly moving member 25 in the left-right direction. For example, a fifth linearly moving mechanism 26 is provided in the fourth linearly moving member 25 to drive the fifth linearly moving member 27 in the left-right direction. The fifth linearly moving member 27 is driven by the fifth linearly moving mechanism 26 so as to move on the right or the left.

The sixth linearly moving member 29 is movably supported by the fifth linearly moving member 27 in the front-back direction. For example, a sixth linearly moving mechanism 28 is provided in the fifth linearly moving member 27 to drive the sixth linearly moving member 29 in the front-back direction. The sixth linearly moving member 29 is driven by the sixth linearly moving mechanism 28 so as to advance or retreat.

The moving conveyor 34 is supported by the sixth linearly moving member 29. Thus, the moving conveyor 34 is supported by the base 12 through the fourth linearly moving member 25, the fifth linearly moving member 27, and the sixth linearly moving member 29. The moving conveyor 34 is driven by the fourth linearly moving member 25 to move in the vertical direction, driven by the fifth linearly moving member 27 to move in the left-right direction, and driven by the sixth linearly moving member 29 to move in the front-back direction. Therefore, the leading end of the moving conveyor 34 can reach over the entire range of the box pallet 50.

The moving conveyor 34 conveys the article 53 in the conveyance direction depicted by an arrow of FIG. 1C, that is, in the −Y direction. As illustrated in FIG. 1B, the moving conveyor 34 includes an annular belt 33, and the belt 33 is wound on pulleys 30, 31, and 32. The pulleys 30, 31, and 32 are rotatably provided about the X axis. The pulley 32 is positioned at the leading end of the moving conveyor 34, the pulley 30 is positioned at the rear end part of the moving conveyor 34, and the pulley 31 is positioned between the pulley 32 and the pulley 30. The diameter of the pulley 30 is the same as that of the pulley 31, and the diameter of the pulley 32 is smaller than that of the pulley 30. In other words, when viewed from the side, the moving conveyor 34 is formed to be narrow toward the leading end and to have a constant thickness at the rear end part. For example, the belt 33 is rotated by torque generated by a motor (not illustrated). The output shaft of the motor is, for example, connected to the pulley 30. In FIG. 1B, three pulleys 30, 31, and 32 are illustrated. Four or more pulleys may be provided in the moving conveyor 34.

The passive roller 35 is disposed on the lower side of the leading end of the moving conveyor 34. In the example of FIG. 1B, four passive rollers 35 are illustrated. The number of passive rollers 35 may be 1, 2, 3 or 5 or more. The passive roller 35 is provided to prevent damage to the article (specifically, the article below the transfer target article) 53 caused by the moving conveyor 34.

In FIG. 1B, it is assumed that an article 53-1 is transferred. In the present embodiment, the transfer apparatus 10 picks up the article 53-1 using an arm part and inserts the leading end of the moving conveyor 34 in a gap (specifically, a gap between the article 53-1 and an article 53-3) generated on the lower side of the article 53-1. Then, the transfer apparatus 10 rotatably drives the belt 33 of the moving conveyor 34 while taking back the gripper 21 so as to load the article 53-1 on the belt 33. In a case where the passive roller 35 is not provided, the moving conveyor 34 may come in contact with the article 53-3 at the time of the inserting, and a label attached to the surface may be damaged (for example, tearing off). In the present embodiment, since the passive roller 35 is disposed on the lower side of the moving conveyor 34, the moving conveyor 34 can be inserted into the gap on the lower side of the article 53-1 without causing damage.

A contact sensor or a reflective sensor may be provided at the leading end of the moving conveyor 34. The contact sensor or the reflective sensor can be used to detect the insertion state of the moving conveyor 34.

It is desirable that the thickness of the leading end be thin to insert the leading end of the moving conveyor 34 and the passive roller 35 into the gap having a small dimension in the vertical direction. This configuration is advantageous in a case where the article 53 stacked in the box pallet 50 is taken out, and particularly in a case where the article is taken out while avoiding the intermediate shelf 51. For example, in a case where the article 53-1 on the front side is taken out and then an article 53-2 on the rear side is taken out, the moving conveyor 34 is inserted into the gap between the intermediate shelf 51 and the article 53-3, and can reach the vicinity of the article 53-2.

As described above, the transfer apparatus 10 takes out the article 53 onto the moving conveyor 34 using the arm part, and transports the article 53 on the moving conveyor 34. In other words, the article 53 is carried while being supported from the lower side. Therefore, even when it is difficult to grip the article by the gripper 21, the article 53 can be transferred to the conveyor 60 without dropping the article 53. Furthermore, even when the article is easily deformed or packed with paper, the article 53 can be transferred to the conveyor 60 without causing damage to the article 53.

The arm is made large in size in the case of the conventional transfer apparatus which directly transfers the article from the pallet to the conveyor using the arm. Therefore, the conventional transfer apparatus is limited in its installation place. Furthermore, the conventional transfer apparatus cannot access the article stored in a box of the box pallet. The transfer apparatus 10 of the present embodiment uses a combination of the gripper 21 and the moving conveyor 34, so that it is possible to be made compact compared to the conventional transfer apparatus. As a result, the transfer apparatus 10 can take out the article disposed in a narrow space such as the article 53 stored in the box pallet 50 having the intermediate shelf 51.

The first driving mechanism 13 and the second driving mechanism 23 illustrated in FIG. 1B are an example of a structure. The first driving mechanism 13 and the second driving mechanism 23 may be constructed in a different structure by combining mechanisms that linearly move in different directions. For example, in the first driving mechanism 13, the third linearly moving member 19 may be movably supported by the first linearly moving member 15 in the front-back direction, and the second linearly moving member 17 may be movably supported by the third linearly moving member 19 in the left-right direction. The second driving mechanism 23 may also be modified similarly to the first driving mechanism 13.

The number of arm parts formed by the first driving mechanism 13, the elastic passive joint part 20, and the gripper 21 is not limited to one as described in the present embodiment. For example, two or more arm parts may be provided. The moving conveyor 34 is not limited to the example of the belt conveyor as illustrated in FIG. 1B, and a conveyor without the belt (for example, a roller conveyor) may be employed. The roller conveyor is provided with a plurality of rollers, and some or all of the plurality of rollers are rotatably driven. The passive rotational element provided on the lower side of the moving conveyor 34 may be configured by winding the belt on a plurality of passive rollers.

Next, the elastic passive joint part 20 will be specifically described.

FIG. 2 schematically illustrates the exemplary structure of the elastic passive joint part 20 in the degree of freedom arrangement. The elastic passive joint part 20 as illustrated in FIG. 2 includes an elastic passive rotational element 20a about the Y axis, an elastic passive linearly moving element 20b in the Y-axis direction, an elastic passive rotational element 20c about the Z axis, and an elastic passive rotational element 20d about the X axis. The elastic passive rotational elements 20a, 20c, and 20d each are rotated about the corresponding axis in an elastic passive way. Specifically, the elastic passive rotational elements 20a, 20c, and 20d each are rotated about the corresponding axis when external force is applied, and return to the original state when the external force is removed. The elastic passive linearly moving element 20b linearly moves in the Y-axis direction in an elastic passive way. Specifically, the elastic passive linearly moving element 20b is shortened in the Y-axis direction when external force is applied, and returns to the original state when the external force is removed. The elastic passive joint part 20 can move in a linear or rotational direction about the vertical direction, the left-right direction, and the front-back direction in an elastic passive way In an example, in a state where an external load is not applied, an elastic force (for example, a biasing force urged by an elastic member) is applied to maintain the gripper 21 in the horizontal state, and the gripper 21 is maintained in the horizontal state using a mechanical stopper. In other words, in a state where the external force is not applied, the elastic passive joint part 20 holds the gripper 21 to be parallel to the horizontal plane by the operation of the elastic member (for example, a spring) of the elastic passive joint part 20. In the present embodiment where the gripper 21 includes the L-shaped member, the gripper 21 is held such that one of the two gripping surfaces is parallel to the horizontal plane and the other one is vertical to the horizontal plane. In another example, the elastic force of the elastic passive joint part 20 is small with respect to the weight of the gripper 21, and the elastic passive joint part 20 is held in a state where the gripper 21 is inclined downward as illustrated in FIG. 3. In a case where the gripper 21 is inclined downward, the arm part is driven to make the gripper 21 to simulate the upper surface edge portion of the target article.

In the example illustrated in FIGS. 2 and 3, the elastic passive rotational element 20a, the elastic passive linearly moving element 20b, the elastic passive rotational element 20c, and the elastic passive rotational element 20d are disposed in this order between the third linearly moving member 19 and the gripper 21. The arrangement of these elements 20a, 20b, 20c, and 20d is not limited to the example illustrated in FIGS. 2 and 3, and may be appropriately changed.

When the gripper 21 moves forward and abuts on the article 53, the elastic passive joint part 20 is changed in shape along the upper surface edge portion of the article. Specifically, the shape of the elastic passive joint part 20 is changed such that two inner surfaces of the gripper 21 face the upper surface and the front surface of the article 53. In other words, the elastic passive joint part 20 supports the gripper 21 such that the posture of the gripper 21 is changed according to the shape and the posture of the article 53. In this way, the elastic passive joint part 20 is formed by a passive mechanism, so that various shapes of articles can be handled. Furthermore, even when the article 53 is inclined with respect to the gripper 21 due to article shifting or disordered stacking, the article 53 can be handled. The elastic passive joint part 20 illustrated in each of FIGS. 2 and 3 is not limited to the application of the transfer apparatus 10, and may be applied to any other apparatuses.

Note that the elastic passive joint part 20 may include at least one elastic passive element (an elastic passive joint). For example, the elastic passive joint part 20 may be formed by one elastic passive linearly moving element and three passive rotational elements.

Figure 4B:
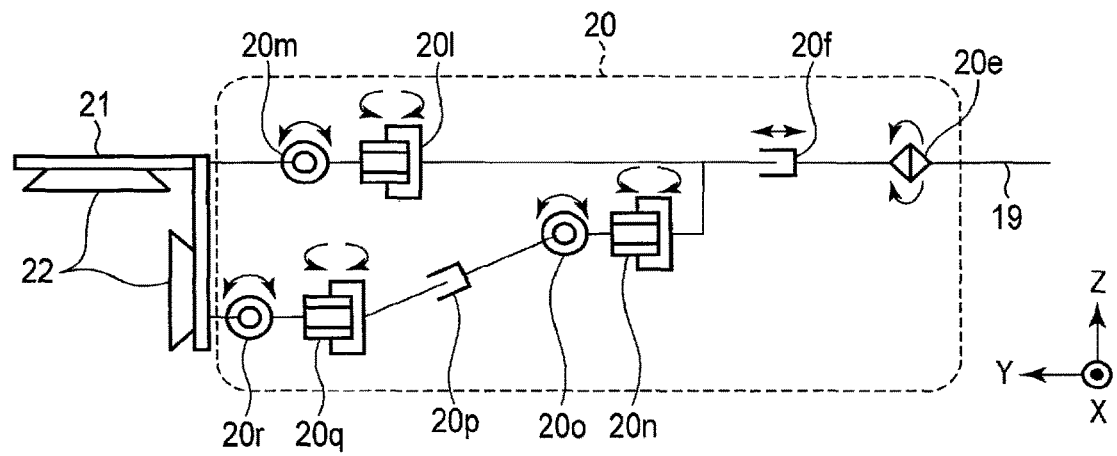
FIG. 4B is a side view of the elastic passive joint part illustrated in FIG. 4A.

FIGS. 4A and 4B are a top view and a side view schematically illustrating another exemplary structure of the elastic passive joint part 20 in the degree of freedom arrangement. The elastic passive joint part 20 illustrated in FIG. 4A includes an elastic passive rotational element 20e about the Y axis, the elastic passive linearly moving element 20f in the Y-axis direction, a passive rotational element 20g about the Z axis, a passive rotational element 20h about the X axis, the elastic passive linearly moving element 20i, a passive rotational element 20j about the Z axis, a passive rotational element 20k about the X axis, a passive rotational element 20l about the Z axis, a passive rotational element 20*m* about the X axis, a passive rotational element 20*n* about the Z axis, a passive rotational element 20*o* about the X axis, the elastic passive linearly moving element 20*p*, a passive rotational element 20*q* about the Z axis, and a passive rotational element 20*r* about the X axis. The elastic passive linearly moving element 20*f* is connected to a combination of the elements 20*l* and 20*m*, a combination of the elements 20*g*, 20*h*, 20*i*, 20*j*, and 20*k*, and a combination of the elements 20*n*, 20*o*, 20*p*, 20*q*, and 20*r*. The combination of the elements 20*l* and 20*m*, the combination of the elements 20*g*, 20*h*, 20*i*, 20*j*, and 20*k*, and the combination of the elements 20*n*, 20*o*, 20*p*, 20*q*, and 20*r* are disposed in parallel. Thus, the elastic passive joint part 20 can move in a linear or rotational direction about the vertical direction, the front-back direction, and the left-right direction in an elastic passive way.

The elastic passive joint part 20 illustrated in FIG. 4A serves as a differential driving mechanism rotating about the passive rotational element 20*l* and the passive rotational element 20*m*, and performs the simulating operation. The differential mechanism described herein is a mechanism which generates one output using two inputs. Specifically, the elastic passive joint part 20 changes the posture of the gripper 21 by differentially moving the elastic passive linearly moving elements 20*i* and 20*p* disposed in parallel. The elastic passive linearly moving elements 20*i* and 20*p* may be gas springs for example. The elastic passive linearly moving element 20*f* may also be a gas spring. The combination of the passive rotational element 20*g* and the passive rotational element 20*h* may be a ball joint structure. Similarly, the combination of the passive rotational element 20*j* and the passive rotational element 20*k*, the combination of the passive rotational element 20*n* and the passive rotational element 20*o*, and the combination of the passive rotational element 20*q* and the passive rotational element 20*r* may also be a ball joint structure. In an example, the elastic passive joint part 20 supports the gripper 21 to be parallel to the horizontal plane by the operation of the elastic body of the elastic passive joint part 20 in a state where the external force is not applied. In another example, the elastic force of the elastic passive joint part 20 is small with respect to the weight of the gripper 21, and the elastic passive joint part 20 is held in a state where the gripper 21 is inclined downward.

A differential mechanism structure illustrated in FIG. 4A can realize a wide movable range in a compact space compared to the structure in which the elastic passive elements are connected in series as illustrated in FIG. 2. In addition, various shapes of articles can be handled by forming the elastic passive joint part 20 as the passive mechanism. Furthermore, even when the article 53 is inclined with respect to the gripper 21, the article 53 can be handled. The elastic passive joint part 20 illustrated in FIG. 4A is not limited to the transfer apparatus 10, and may be applied to any other apparatuses.

Further, the structures illustrated in FIGS. 2, 3, and 4A are simple examples, and the structure of the elastic passive joint part 20 is not limited to these examples.

FIG. 5 schematically illustrates a control system of the transfer apparatus 10. As illustrated in FIG. 5, the transfer apparatus 10 further includes a sensor unit 40, a gripper controller 41, and a conveyor controller 42. The gripper controller 41 and the conveyor controller 42 may be realized such that a processor such as a central processing unit (CPU) executes a control program stored in a memory device such as a ROM or a HDD. For example, the processor reads the control program from the ROM or the HDD, and develops the control program on the RAM so as to function as the gripper controller 41 and the conveyor controller 42.

The sensor unit 40 detects the position and the shape of the article to be transferred (referred to as a target article) to generate a detection signal. For example, the sensor unit 40 detects an upper surface edge position and a lower surface position (a gap on the lower side of the target article) of the target article. For example, the sensor unit 40 includes an image sensor which captures the image of the target article and generates an image signal, and the image processing unit which performs image processing on the image signal to detect the position and the shape of the target article. For example, the image sensor is provided in the bottom part 12A of the base 12. Further, the sensor unit 40 may not include an image processing unit, and the gripper controller 41 and the conveyor controller 42 may perform the image processing.

The conveyor controller 42 performs positioning control of the moving conveyor 34 with respect to the target article based on the detection signal acquired from the sensor unit 40. Specifically, the conveyor controller 42 determines, based on the detection signal acquired from the sensor unit 40, the position of the moving conveyor 34 when the target article is taken out by the gripper 21. The conveyor controller 42 controls the fourth linearly moving mechanism 24 such that the leading end of the moving conveyor 34 comes flush with the lower surface of the target article, controls the fifth linearly moving mechanism 26 such that the leading end of the moving conveyor 34 faces the target article, and controls the sixth linearly moving mechanism 28 such that the moving conveyor 34 approaches the target article. The conveyor controller 42 further performs rotation control of the belt 33 of the moving conveyor 34. Specifically, the conveyor controller 42 controls a motor linked to the belt 33 through the pulley.

The gripper controller 41 performs positioning control of the gripper 21 with respect to the target article based on the detection signal received from the sensor unit 40. Specifically, the gripper controller 41 determines a position to be gripped in the target article based on the detection signal received from the sensor unit 40. Then, the gripper controller 41 drives the first linearly moving mechanism 14, the second linearly moving mechanism 16, and the third linearly moving mechanism 18 so as to make the gripper 21 come into contact at the determined position. In addition, the gripper controller 41 drives the gripper 21 to hold the target article. Furthermore, the gripper controller 41 drives the third linearly moving mechanism 18 to make the gripper 21 retreat when the target article gripped by the gripper 21 is loaded on the moving conveyor 34.

In a case where there is an influence such as a variation in illumination conditions or the high density loading of articles, the target article cannot be stably recognized by an external information acquisition sensor (for example, an image sensor). Therefore, the automation of the operation of taking out the articles becomes difficult. For example, it is difficult to detect a gap between the densely stacked articles. On the other hand, the upper surface edge of the article is detected more easily. Furthermore, a large gap which is generated on the lower side of the article when the article is picked up is detected more easily. Therefore, according to the present embodiment in which the article is taken out from the box pallet 50 in the above-described method, the operation of taking out the article can be automated. An article taking-out method described in this embodiment is not limited to the transfer apparatus 10 of the present embodiment, and may be applied to other apparatuses which take out the article.

Next, an example of the operation of the transfer apparatus 10 will be described with reference to FIGS. 6A to 14B.

FIGS. 6A, 7A, 8A, 9A, 10A, 11A, 12A, 13A, and 14A are top views schematically illustrating a series of operations in which the article 53-1 is transferred to the conveyor 60 among the articles 53 stacked and stored in the box pallet 50. FIGS. 6B, 7B, 8B, 9B, 10B, 11B, 12B, 13B, and 14B are respectively cross-sectional views of the transfer apparatus 10 taken along line B-B' illustrated in FIGS. 6A, 7A, 8A, 9A, 10A, 11A, 12A, 13A, and 14A. Further, in FIGS. 6A, 7A, 8A, 9A, 10A, 11A, 12A, 13A, and 14A, the intermediate shelf 51 and the articles 53 disposed thereon are omitted. In addition, in FIGS. 6B, 7B, 8B, 9B, 10B, 11B, 12B, 13B, and 14B, articles 53-4 and 53-5 are omitted.

Figure 6A:
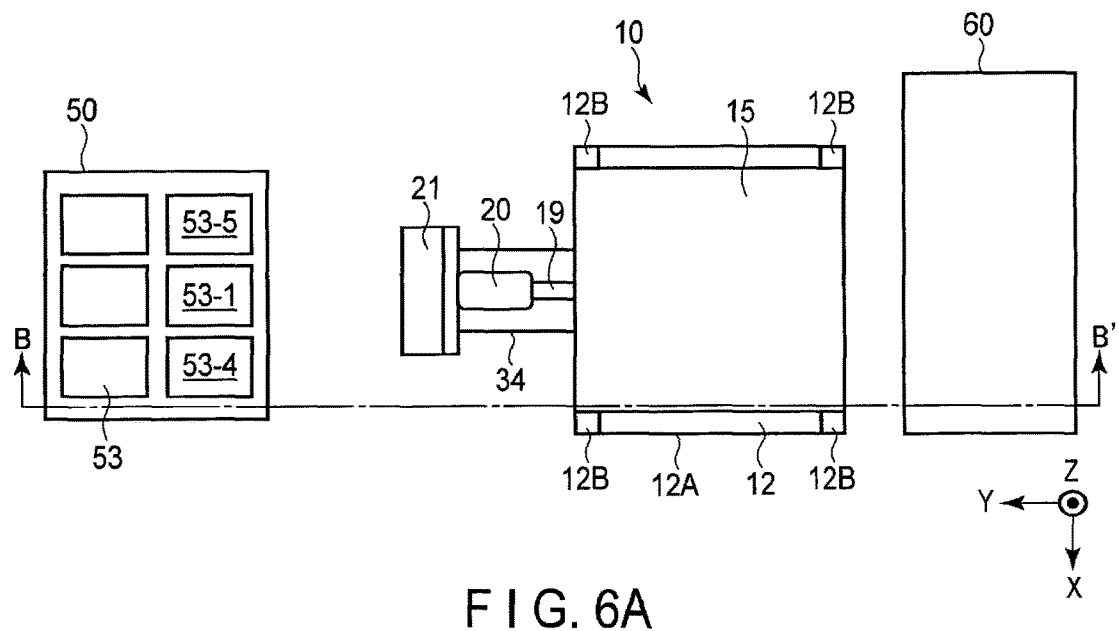
FIG. 6A is a top view illustrating an example of the operation of the transfer apparatus illustrated in FIG. 1.
Figure 6B:
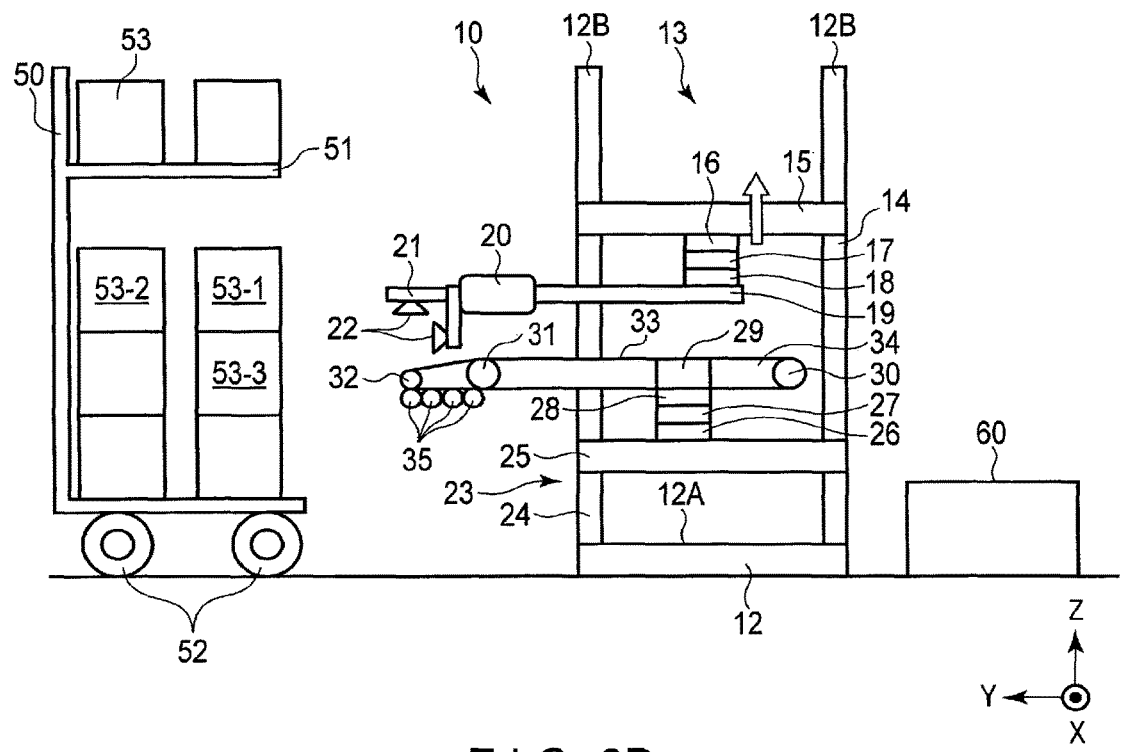
FIG. 6B is a cross-sectional view taken along line B-B' illustrated in FIG. 6A.

First, the sensor unit 40 detects the upper surface edge of the target article 53-1 among the stacked articles 53. As illustrated in FIGS. 6A and 6B, the first linearly moving member 15 is driven by the first linearly moving mechanism 14, and the gripper 21 ascends such that the height of its end comes flush with the upper surface edge portion of the target article 53-1.

As illustrated in FIGS. 7A and 7B, the second linearly moving member 17 is driven by the second linearly moving mechanism 16, and the gripper 21 moves in the left-right direction to face the target article 53-1. Subsequently, the third linearly moving member 19 is driven by the third linearly moving mechanism 18, and the gripper 21 moves toward the target article 53-1. Then, the third linearly moving member 19 is driven such that the gripper 21 closely presses the upper surface and the front surface of the upper surface edge portion of the target article 53-1, and the target article 53-1 is gripped by the gripper 21. At this time, even when the target article 53-1 is inclined due to the article shifting, the gripping surface of the gripper 21 is disposed along the upper surface and the side surface of the target article 53-1 by a pressing force of the third linearly moving member 19 and the simulating operation of the elastic passive joint part 20. At this time, the gripping state can be detected based on the output of a proximity sensor or a reflective sensor provided at the gripping surface of the gripper 21.

As illustrated in FIGS. 8A and 8B, the first linearly moving member 15 is driven by the first linearly moving mechanism 14, and the gripper 21 moves upward in a state where the upper surface edge portion of the target article 53-1 is gripped. The target article 53-1 is picked up by the gripper 21 to open a gap on the lower side of the target article 53-1 while the target article 53-1 tilts by the weight of the target article 53-1 and an elastic member of the elastic passive joint part 20. In this case, a part of the lower surface of the target article 53-1 is in a state of abutting on the upper surface of the article 53-3. Therefore, the entire weight of the target article 53-1 is not applied on the gripper 21, and the target article 53-1 is picked up in a state where the driving force of the first linearly moving member 15 is suppressed.

Figure 9A:
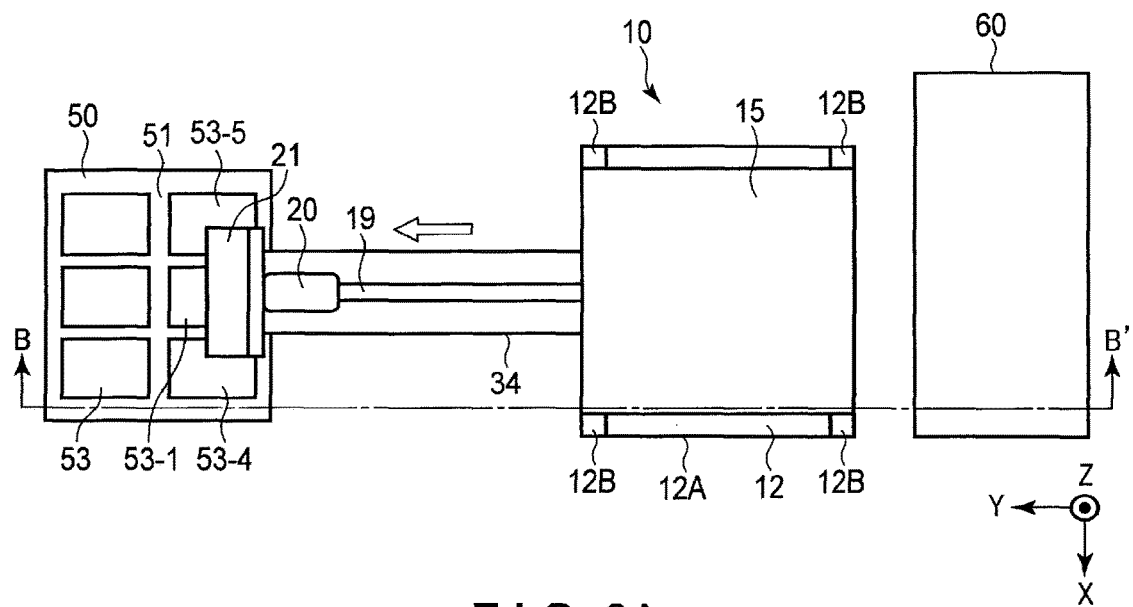
FIG. 9A is a top view illustrating the example of the operation of the transfer apparatus illustrated in FIG. 1.
Figure 9B:
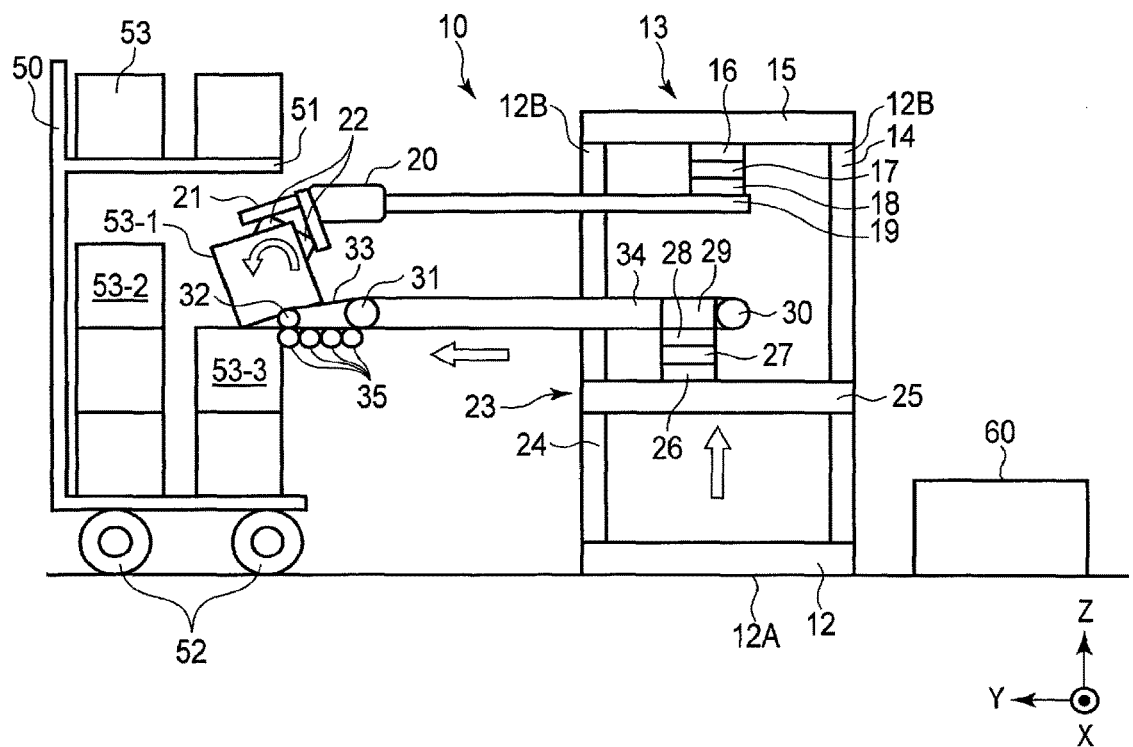
FIG. 9B is a cross-sectional view taken along line B-B' illustrated in FIG. 9A.

Subsequently, the sensor unit 40 detects a gap on the lower side of the target article 53-1. As illustrated in FIGS. 9A and 9B, the fourth linearly moving member 25 is driven by the fourth linearly moving mechanism 24, and the moving conveyor 34 ascends such that the height of its end comes flush with the height of the gap on the lower side of the target article 53-1. Next, the fifth linearly moving member 27 is driven by the fifth linearly moving mechanism 26, and the moving conveyor 34 moves in the left-right direction to face the target article 53-1. Subsequently, the sixth linearly moving member 29 is driven by the sixth linearly moving mechanism 28, and the moving conveyor 34 moves forward toward the target article 53-1. Then, the sixth linearly moving member 29 is driven such that the leading end of the moving conveyor 34 and the passive roller 35 are inserted into the gap on the lower side of the target article 53-1, and the belt 33 of the moving conveyor 34 abuts on the lower surface of the target article 53-1. At this time, the passive roller 35 comes into contact with the upper surface of the article 53-3, but friction does not occur between the passive roller 35 and the article 53-3 by the operation of the passive roller 35. The leading end of the moving conveyor 34 can be inserted into the gap on the lower side of the target article 53-1 without causing damage to the article 53-3. Therefore, the friction between the target article 53-1 and the article 53-3 on the lower side of the target article is reduced, and the target article 53-1 is easily taken out. At this time, the insertion state can be detected based on the output of the contact sensor or the reflective sensor provided at the leading end of the moving conveyor 34.

As illustrated in FIGS. 10A and 10B, the gripper 21 causes the target article 53-1 move onto the belt 33 of the moving conveyor 34. At this time, the belt 33 is driven in synchronization with the gripper 21. Specifically, the transfer apparatus 10 is configured such that the belt 33 is rotatably driven to convey the target article 53-1 in the conveyance direction indicated by an arrow of FIG. 10B, while making the gripper 21 retreat according to the driving of the third linearly moving member 19. With this configuration, the target article 53-1 can be easily loaded on the belt 33. Furthermore, since the gripper 21 is connected to the third linearly moving member 19 through the elastic passive joint part 20, the gripper 21 can make the target article 53-1 move on the belt 33 of the moving conveyor 34 while simulating the lower surface of the target article 53-1 to abut on the belt 33. Note that the transfer apparatus 10 may be configured to make the target article 53-1 move on the belt 33 by the rotation of the belt 33 without making the gripper 21 retreat.

Figure 11A:
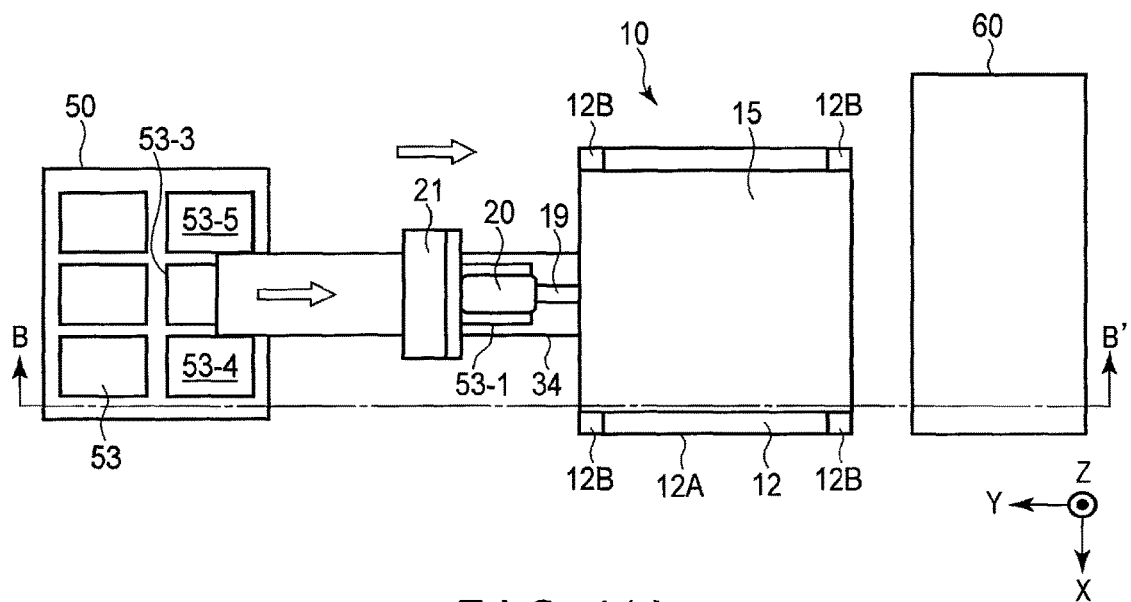
FIG. 11A is a top view illustrating the example of the operation of the transfer apparatus illustrated in FIG. 1.
Figure 11B:
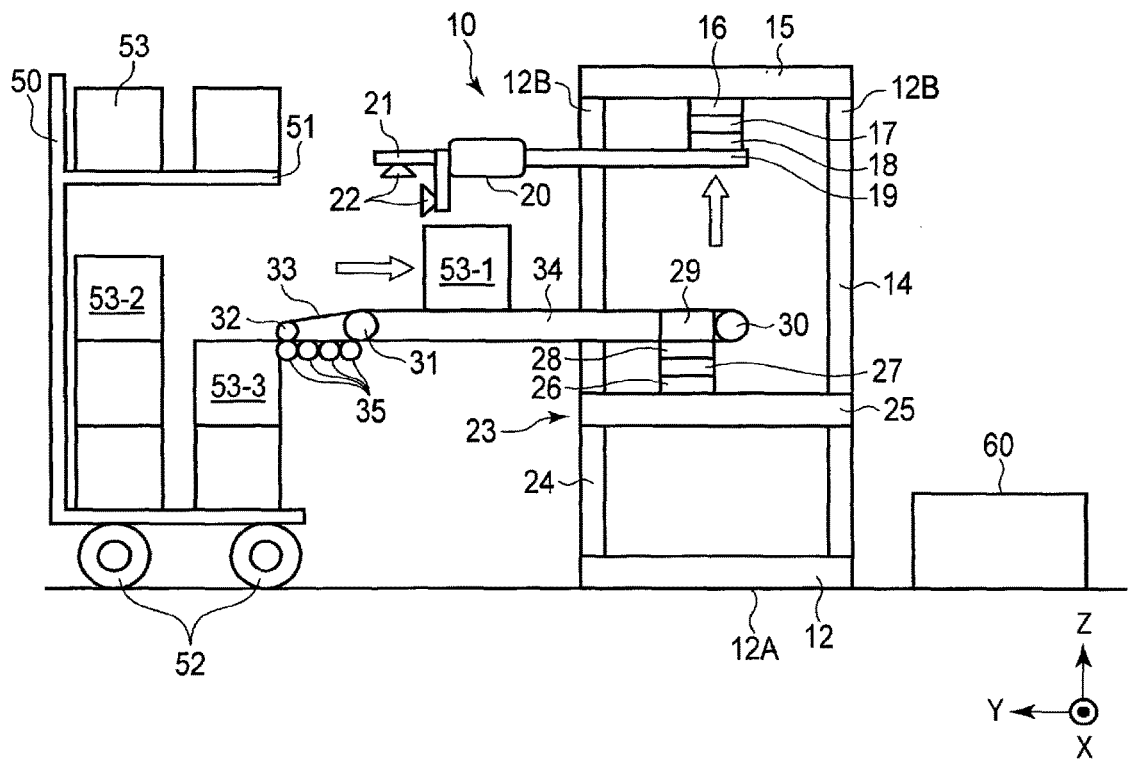
FIG. 11B is a cross-sectional view taken along line B-B' illustrated in FIG. 11A.

As illustrated in FIGS. 11A and 11B, after the target article 53-1 is loaded on the belt 33, the gripper 21 is changed to an article avoiding posture so as not to prevent the flowing of the target article 53-1 on the belt 33. In other words, the gripper controller 41 makes the gripper 21 retreat from the moving conveyor 34. The moving conveyor 34 conveys the target article 53-1, and the entire target article 53-1 is stopped after being placed on the belt 33.

The plurality of articles 53 can be loaded on the moving conveyor 34 by repeatedly performing the operations illustrated in FIGS. 6A, 7A, 8A, 9A, and 10A. For example, the transfer apparatus 10 is operated to load as many loading articles 53 as possible onto the moving conveyor 34. In the example illustrated in FIGS. 11A and 11B, one article 53-1 is loaded on the moving conveyor 34.

Figure 12A:
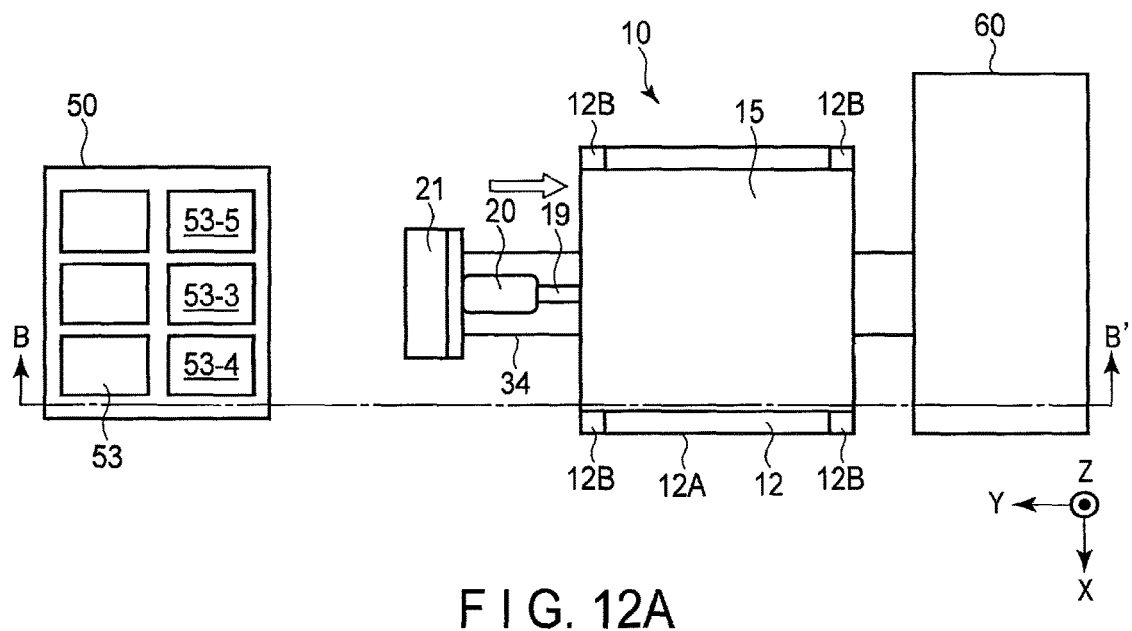
FIG. 12A is a top view illustrating the example of the operation of the transfer apparatus illustrated in FIG. 1.
Figure 12B:
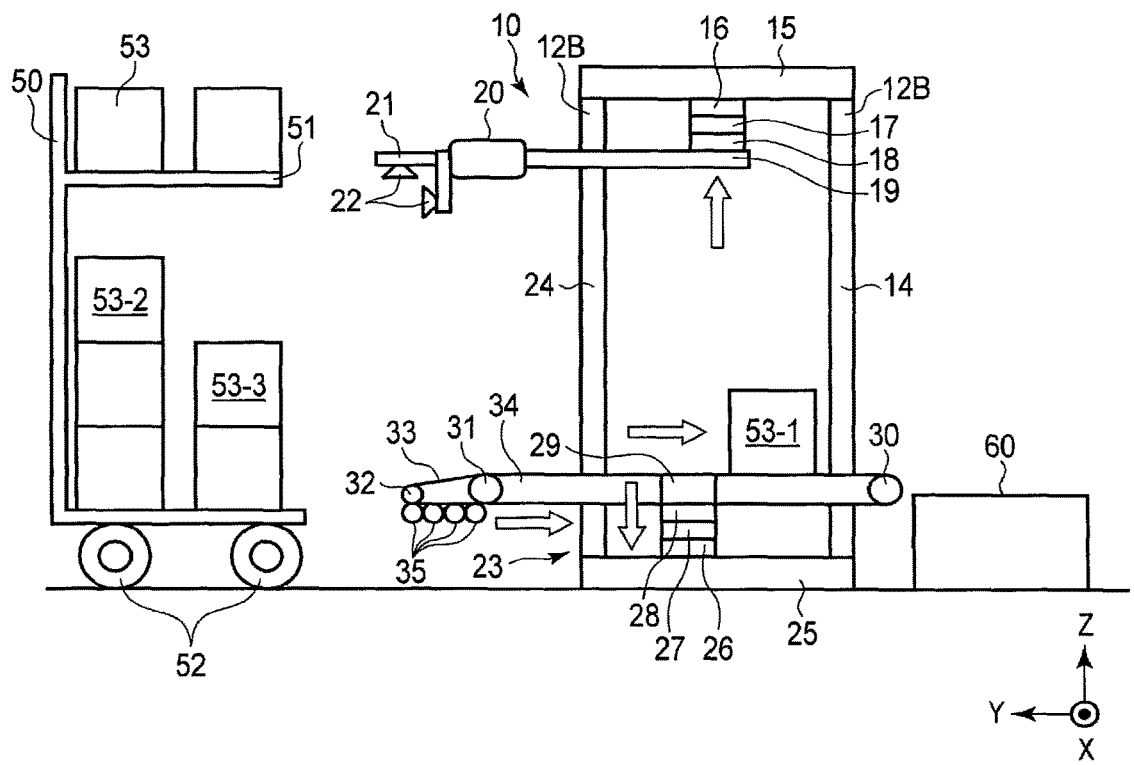
FIG. 12B is a cross-sectional view taken along line B-B' illustrated in FIG. 12A.
Figure 13A:
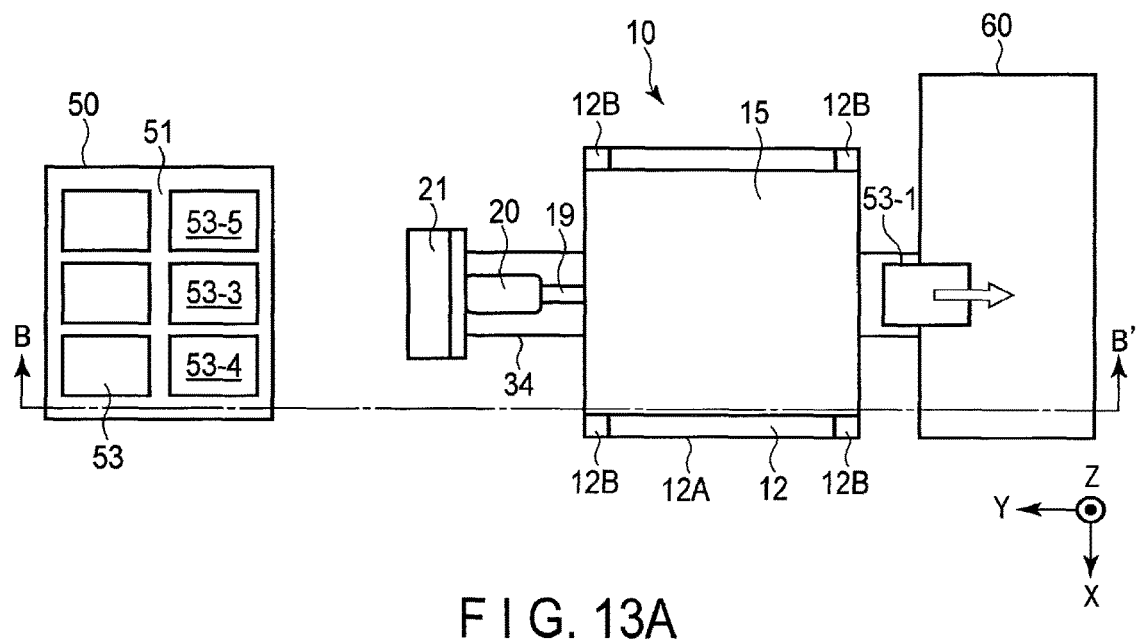
FIG. 13A is a top view illustrating the example of the operation of the transfer apparatus illustrated in FIG. 1.
Figure 13B:
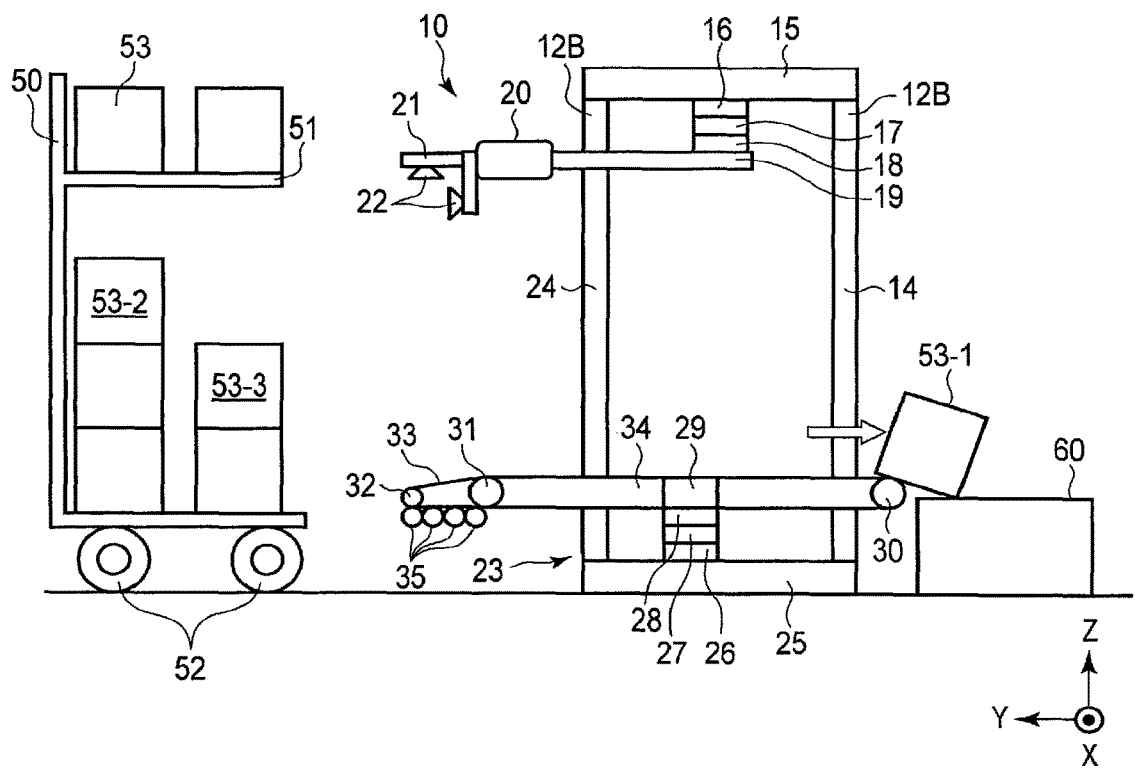
FIG. 13B is a cross-sectional view taken along line B-B' illustrated in FIG. 13A.
Figure 14A:
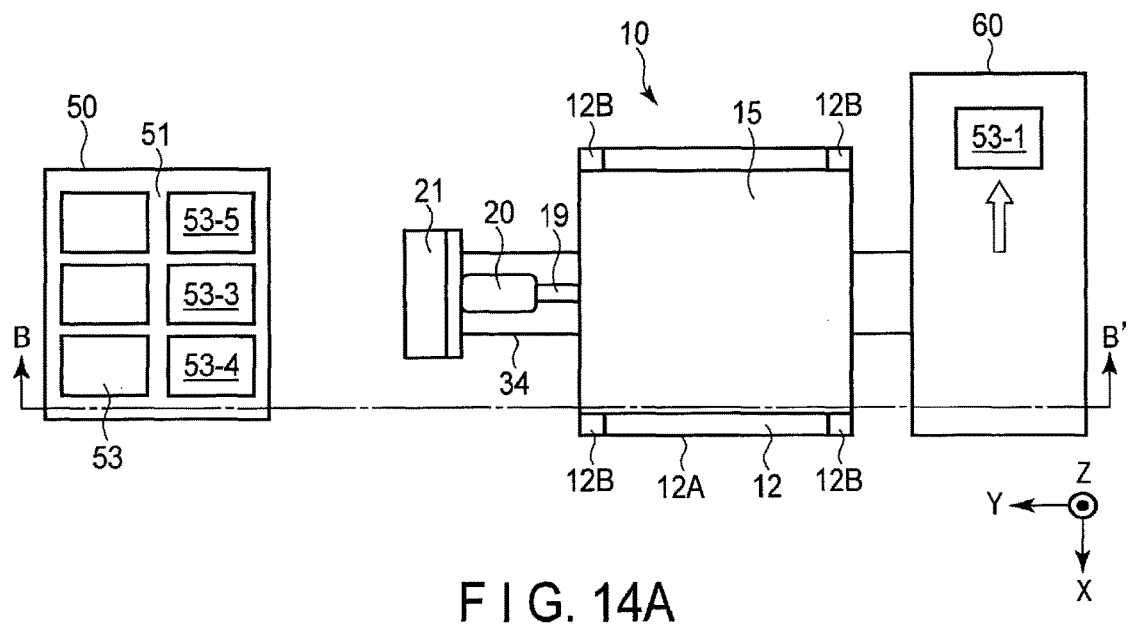
FIG. 14A is a top view illustrating the example of the operation of the transfer apparatus illustrated in FIG. 1.
Figure 14B:
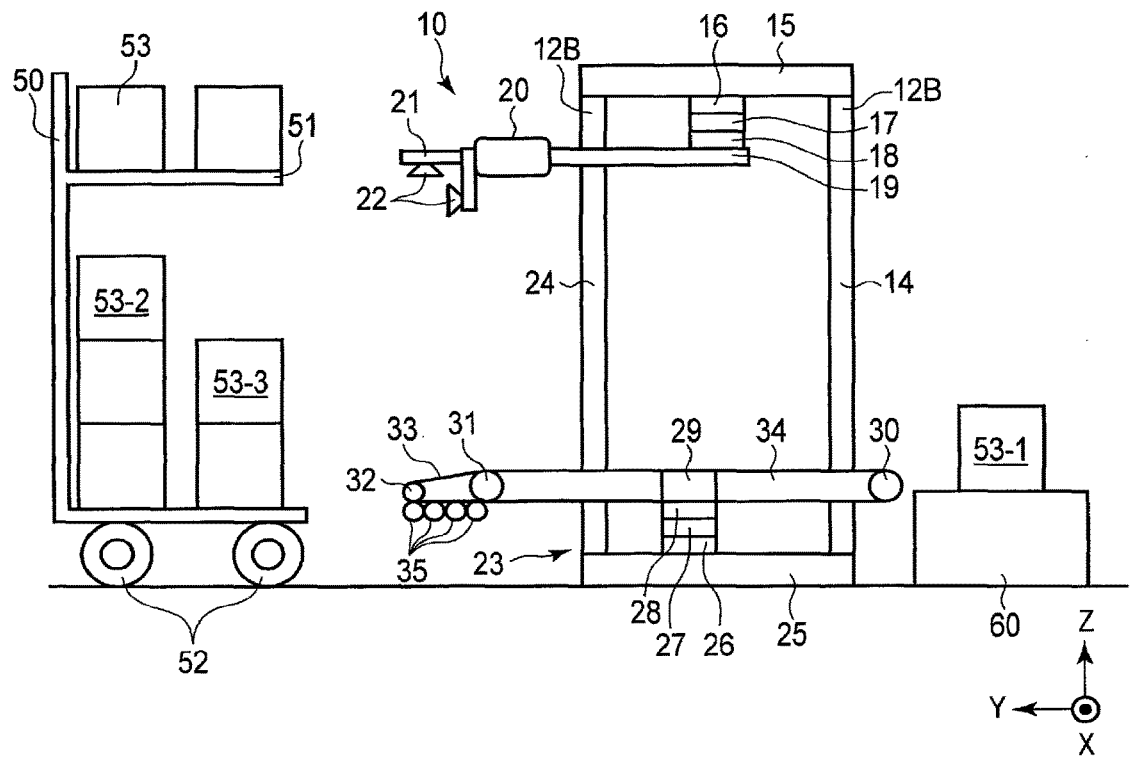
FIG. 14B is a cross-sectional view taken along line B-B' illustrated in FIG. 14A.

As illustrated in FIGS. 12A and 12B, the moving conveyor 34 retreats, and then the moving conveyor 34 descends down to the position of the conveyor 60. As illustrated in FIGS. 13A and 13B, the belt 33 of the moving conveyor 34 is rotatably driven, and thereby the target article 53-1 is unloaded to the conveyor 60. As illustrated in FIGS. 14A and 14B, the target article 53-1 is conveyed by the conveyor 60. The conveyor 60 is, for example, a belt conveyor which conveys the article 53 in the conveyance direction depicted by an arrow B of FIG. 14A. The place where the transfer apparatus 10 transfers the article (also called an unloading place) is not limited to the dynamic table such as the conveyor 60, and a static table such as a pallet or a working table may be used.

When the article 53-1 is unloaded from the moving conveyor 34 to the conveyor 60, the article 53 is temporarily held on the two working belts. Therefore, in a case where the conveyance direction of the moving conveyor 34 is different from the conveyance direction of the conveyor 60, the posture of the article is changed at the time of the unloading to the conveyor 60. In the present embodiment, the conveyance direction of the moving conveyor 34 is substantially perpendicular to the conveyance direction of the conveyor 60. For example, in a case where the article 53 is conveyed by the moving conveyor 34 in a state of being aligned in the conveyance direction of the moving conveyor 34, the article 53 is positioned to be inclined with respect to the conveyance direction of the conveyor 60 after the unloading to the conveyor 60. It is desirable that the article 53 be aligned in the conveyance direction of the conveyor 60 on the conveyor 60. In an embodiment, the gripper 21 loads the article 53 on the moving conveyor 34 in a state where the article 53 is positioned to be inclined with respect to the conveyance direction in consideration of the posture change at the time of the inserting to the conveyor 60. Therefore, the article 53 can be aligned in the conveyance direction of the conveyor 60.

In this way, the transfer apparatus 10 takes out the article 53 heading for the moving conveyor 34 using the gripper 21, and loads the article 53 on the moving conveyor 34 for the delivery thereof. Therefore, the article 53 can be transferred to the unloading place without dropping the article 53 and without causing damage to the article 53.

The above-described example of the operation has been simplified for the sake of explanation, and the actual operations may be different. For example, in the above-described example of the operation, the movement in the upward and downward direction, the movement in the left-right direction, and the movement in the front-back direction are made one time respectively until the gripper 21 grips the target article 53-1. In the actual operation, the movement in the upward and downward direction, the movement in the left-right direction, and the movement in the front-back direction may be performed plural times until the gripper 21 grips the target article 53-1.

As described above, the transfer apparatus according to the first embodiment includes the gripper which is movable in the vertical direction, the front-back direction, and the left-right direction, the elastic passive joint part which is interposed between the gripper and the first driving mechanism making the gripper move and operates in accordance with the operation of the gripper, and the moving conveyor which is movable in the vertical direction, the front-back direction, and the left-right direction. The article is transferred using the moving conveyor and the gripper. Therefore, various shapes of articles can be handled, and it is possible to stably transfer the articles. Furthermore, with the moving conveyor, the apparatus can be reduced in size compared to the conventional transfer apparatus which uses only the arm.

Second Embodiment

A second embodiment will be described with reference to FIGS. 15 to 17.

Figure 15:
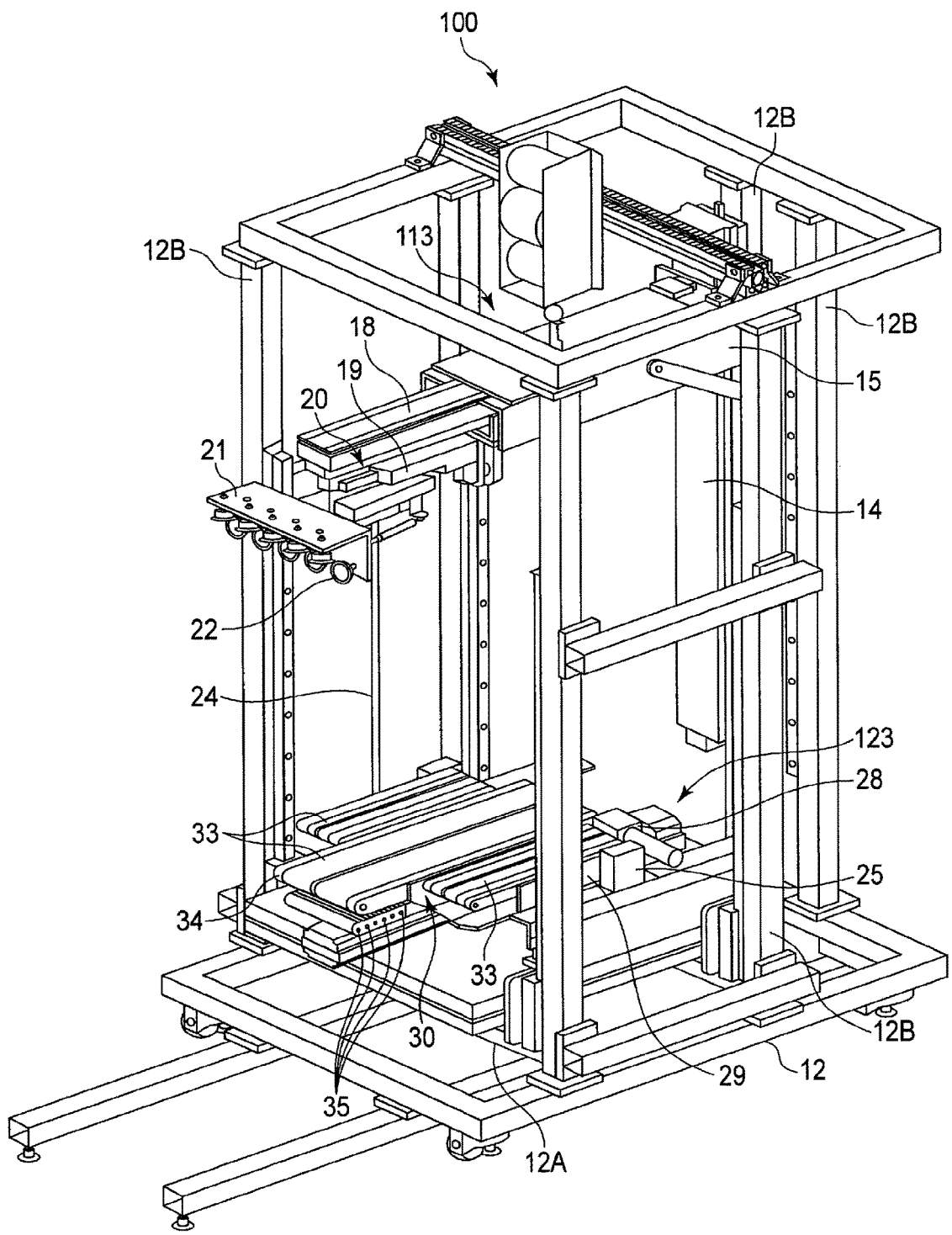
FIG. 15 is a perspective view illustrating the outline of a transfer apparatus according to a second embodiment.
Figure 16:
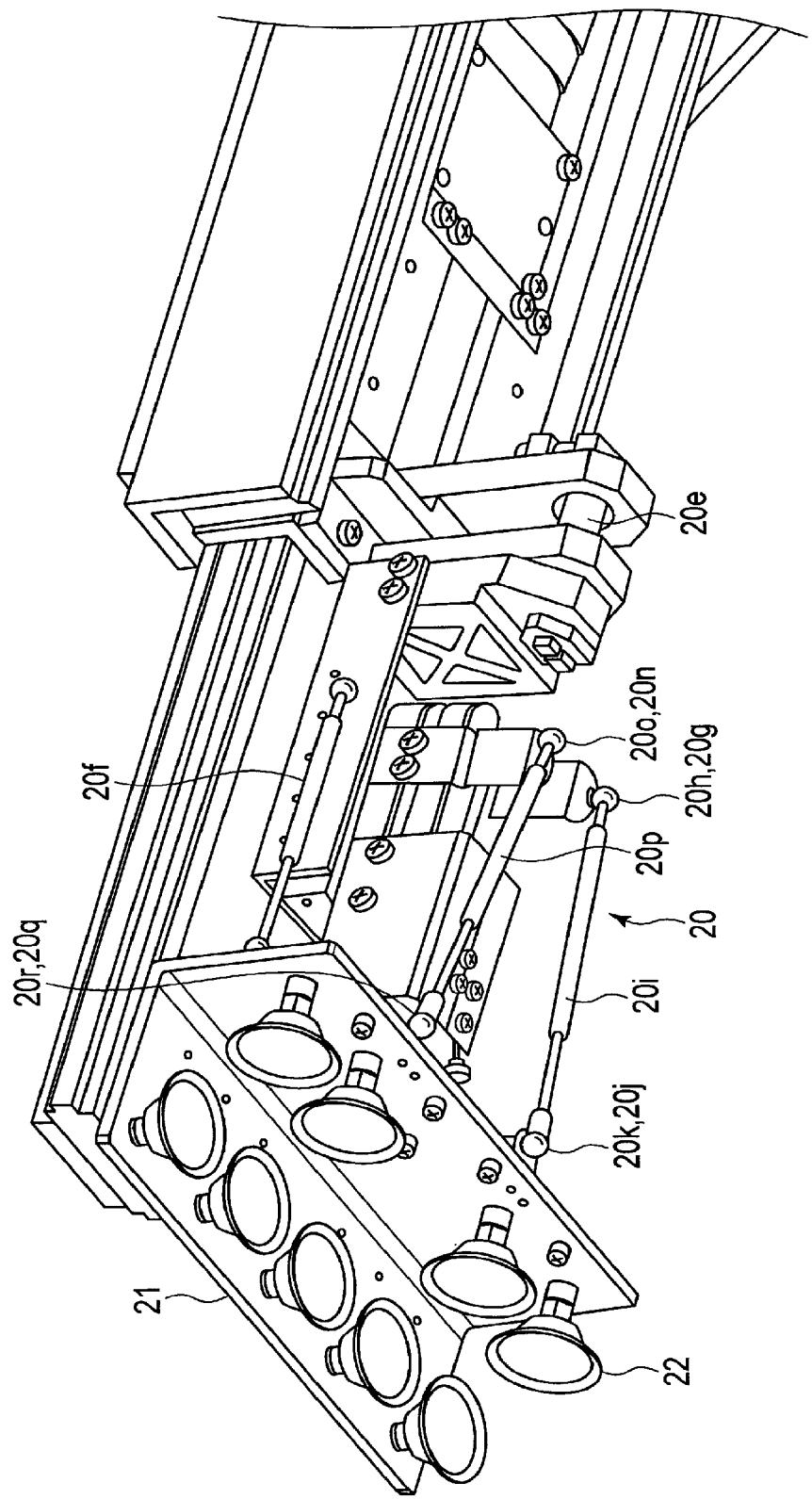
FIG. 16 is an enlarged view illustrating an elastic passive joint part and a gripper of the transfer apparatus illustrated in FIG. 15.
Figure 17:
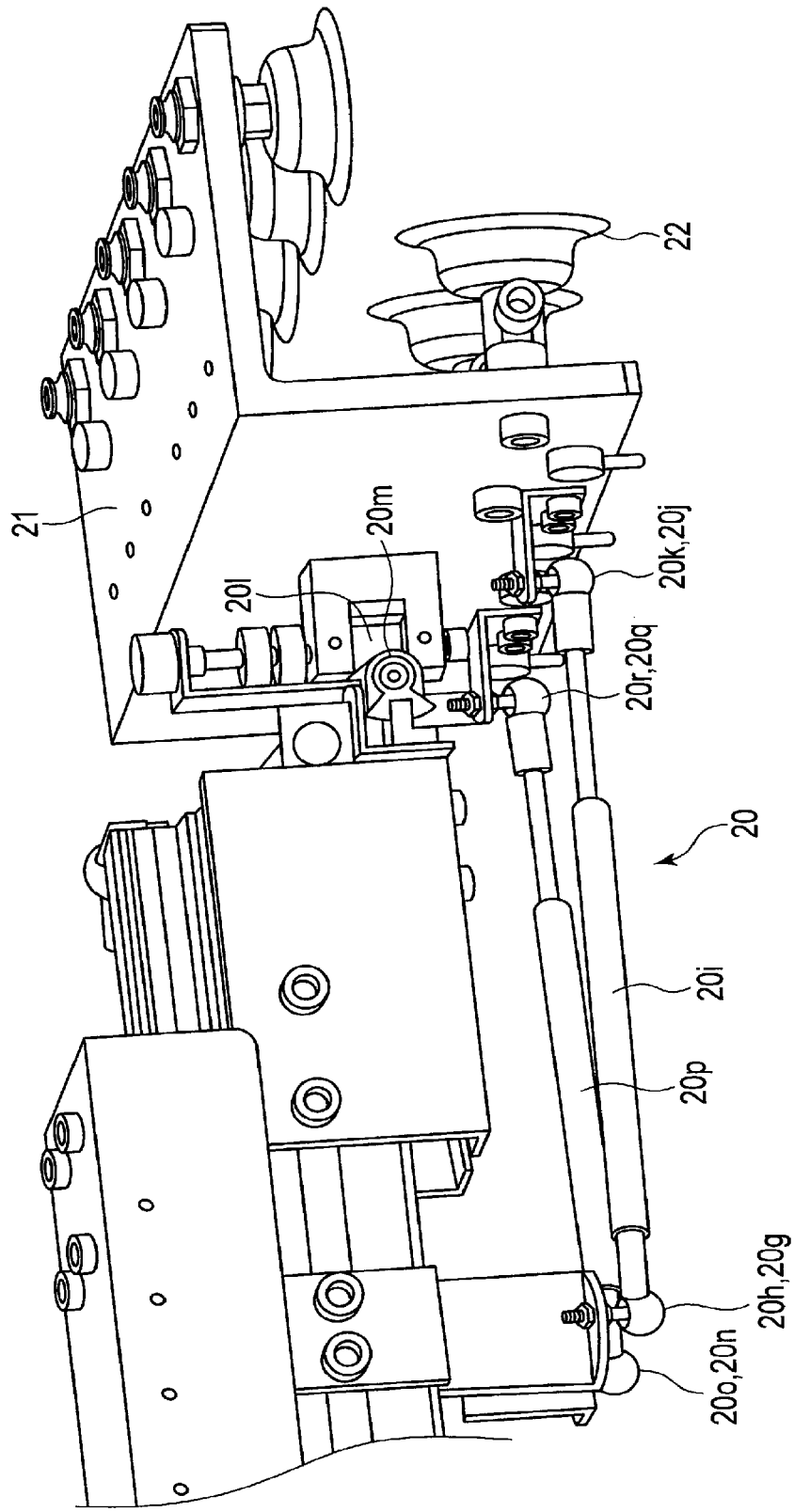
FIG. 17 is an enlarged view illustrating the elastic passive joint part and the gripper of the transfer apparatus illustrated in FIG. 15.

FIG. 15 illustrates a detailed structure of a transfer apparatus 100 according to the second embodiment, and FIGS. 16 and 17 illustrate a part of the transfer apparatus 100 including an elastic passive joint part 20 and a gripper 21 illustrated in FIG. 15. In FIGS. 15 to 17, the same elements as those illustrated in FIG. 1B will be denoted by the same symbols, and a redundant description will not be repeated.

One main difference between the transfer apparatus 100 illustrated in FIG. 15 and the transfer apparatus 10 illustrated in FIG. 1B is that the transfer apparatus 100 does not include the mechanism to make the gripper 21 move in the left-right direction and the mechanism to make a moving conveyor 34 move in the left-right direction. In other words, in the transfer apparatus 100, each of the gripper 21 and the moving conveyor 34 can linearly move in two directions of the vertical direction and the front-back direction.

Specifically, as illustrated in FIG. 15, the transfer apparatus 100 includes a first driving mechanism 113 which linearly moves the gripper 21 in the vertical direction and the front-back direction, and a second driving mechanism 123 which linearly moves the moving conveyor 34 in the vertical direction and the front-back direction. The first driving mechanism 113 includes a first linearly moving member 15 which is movably supported by a base 12 in the vertical direction, and a third linearly moving member 19 which is movably supported by the first linearly moving member 15 in the front-back direction and is connected to the elastic passive joint part 20. The second driving mechanism 123 includes a fourth linearly moving member 25 which is movably supported by the base 12 in the vertical direction, and a sixth linearly moving member 29 which is movably supported by the fourth linearly moving member 25 in the front-back direction and is connected to the moving conveyor 34.

The moving conveyor 34 of the present embodiment is configured such that the leading end is narrow, and a part of the rear end side is widened. Specifically, the moving conveyor 34 includes three belts 33, and these belts 33 are disposed to form a T shape when viewed from the top. Therefore, the leading end of the moving conveyor 34 can be inserted into a gap on the lower side of the narrow article. Furthermore, the article is loaded on the moving conveyor 34, and then is moved to the wide part of the moving conveyor 34. Therefore, it is possible to stably transfer the article.

The elastic passive joint part 20 of this embodiment includes a differential mechanism corresponding to the exemplary structure illustrated in FIG. 4A. In the elastic passive joint part 20 of the present embodiment, as illustrated in FIGS. 16 and 17, the elastic passive linearly moving elements 20f, 20i, and 20p are gas springs. A combination of a passive rotational element 20g and a passive rotational element 20h, a combination of a passive rotational element 20j and a passive rotational element 20k, a combination of a passive rotational element 20n and a passive rotational element 20o, and a combination of a passive rotational element 20q and a passive rotational element 20r are ball joints.

According to the second embodiment, the same effect as that of the first embodiment can be obtained.

Third Embodiment

Figure 18:
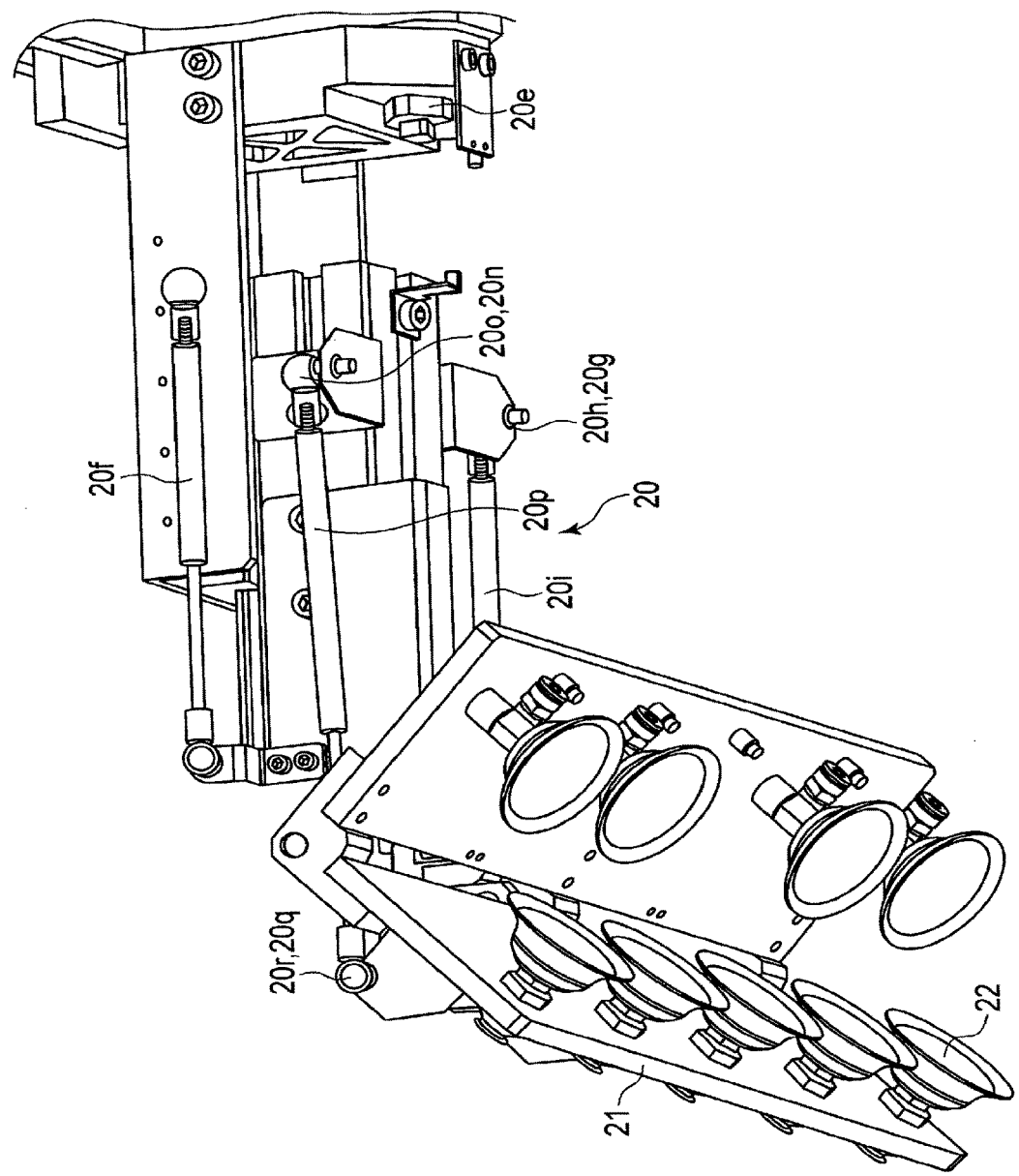
FIG. 18 is a diagram illustrating an elastic passive joint part and a gripper of a transfer apparatus according to a third embodiment.

A third embodiment will be described with reference to FIGS. 18 and 19. A different point between the third embodiment and the second embodiment is the structure of an elastic passive joint part 20. The other elements of the third embodiment are the same as those of the second embodiment, and thus the description of the elements other than the elastic passive joint part 20 will not be repeated.

The elastic passive joint part 20 of the second embodiment holds the gripper 21 in the horizontal state in a state where the external force is not applied. On the contrary, as illustrated in FIG. 18, the elastic passive joint part 20 of the third embodiment holds the gripper 21 to be inclined downward in a state where the external force is not applied.

The elastic passive joint part 20 of this embodiment includes a differential mechanism corresponding to the exemplary structure illustrated in FIG. 4A. In the elastic passive joint part 20 of this embodiment, the elastic passive linearly moving elements 20f, 20i, and 20p are gas springs as illustrated in FIGS. 18 and 19. A combination of a passive rotational element 20g and a passive rotational element 20h, a combination of a passive rotational element 20j and a passive rotational element 20k, a combination of a passive rotational element 20n and a passive rotational element 20o, and a combination of a passive rotational element 20q and a passive rotational element 20r are ball joints.

Figure 19:
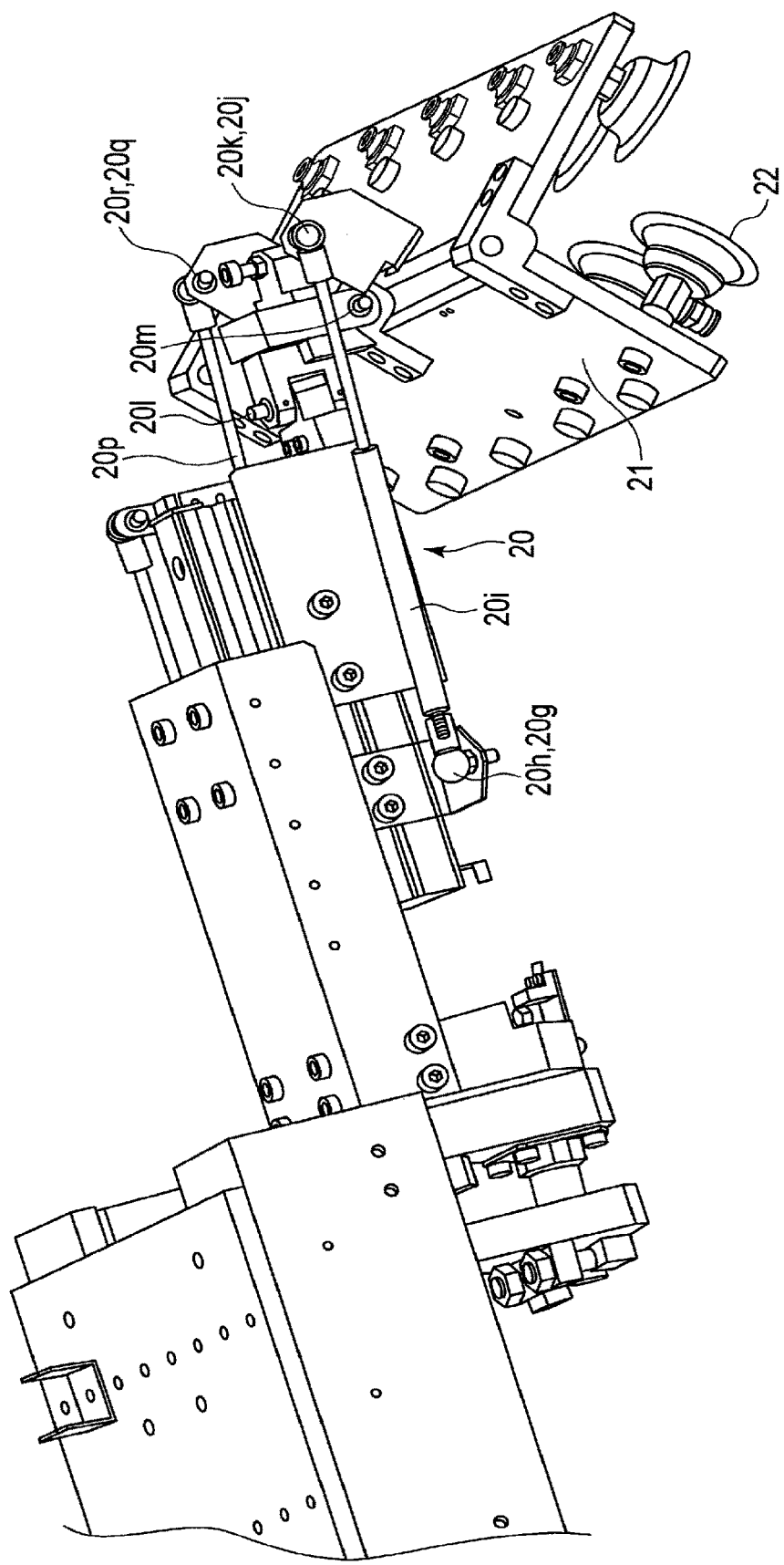
FIG. 19 is a diagram illustrating the elastic passive joint part and the gripper illustrated in FIG. 18 when viewed in a different direction.

In this embodiment, as illustrated in FIG. 19, gas springs 20i and 20p are disposed above a passive rotational element 20m. With this arrangement, the gripper 21 is maintained to be inclined downward in a state where the external force is not applied.

According to the third embodiment, the same effect as that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transfer apparatus, comprising:
   a gripper which grips an article;
   a first driving mechanism which linearly moves the gripper in at least three directions, the at least three directions including a first direction, a second direction intersecting with the first direction, and a third direction intersecting with the first direction and the second direction;
   an elastic passive joint part which is interposed between the gripper and the first driving mechanism, the elastic passive joint part operating in accordance with an operation of the gripper;
   a conveyor which conveys the article;
   a second driving mechanism which moves the conveyor, the second driving mechanism being connected to the conveyor; and
   a base which supports the first driving mechanism and the second driving mechanism, wherein
   the first driving mechanism comprises:
      a first moving member linearly movably supported by the base in the first direction;
      a second moving member linearly movably supported by the first moving member in the second direction; and
      a third moving member linearly movably supported by the second moving member in the third direction and connected to the elastic passive joint part.

2. The transfer apparatus according to claim 1, further comprising a passive rotational element provided on a lower side of the conveyor.

3. The transfer apparatus according to claim 1, wherein
   the first driving mechanism moves the gripper upward in a state where the gripper grips the article to make a gap on a lower side of the article, and
   the second driving mechanism moves the conveyor to insert a leading end of the conveyor into the gap.

4. The transfer apparatus according to claim 3, wherein the second driving mechanism linearly moves the conveyor in at least two directions, the at least two directions including a fourth direction and a fifth direction intersecting with the fourth direction.

5. The transfer apparatus according to claim 1, wherein the elastic passive joint part comprises at least one elastic passive element.

6. The transfer apparatus according to claim 1, wherein the elastic passive joint part comprises a differential mechanism in which elastic passive linearly moving elements are disposed in parallel.

7. The transfer apparatus according to claim 1, wherein the gripper is in a horizontal state or in a state inclined downward before the gripper comes into contact with the article.

8. The transfer apparatus according to claim 1, further comprising:
   a conveyor controller which performs positioning control of the conveyor with respect to the article and rotation control of the conveyor; and
   a gripper controller which performs positioning control of the gripper with respect to the article.

9. The transfer apparatus according to claim 8, further comprising:
   a detector which detects an upper surface edge of the article or a position and a shape of the article to generate a detection signal, wherein
   the gripper controller determines a position to be gripped in the article based on the detection signal.

10. The transfer apparatus according to claim 1, wherein the gripper loads the article on the conveyor to be inclined with respect to a direction in which the conveyor conveys the article.

11. The transfer apparatus according to claim 1, wherein the gripper grips the article by suction.

12. The transfer apparatus according to claim 1, wherein the gripper grips the article by adhesion.

13. The transfer apparatus according to claim 1, wherein the gripper is positioned above the conveyor.

14. The transfer apparatus according to claim 1, wherein the second driving mechanism comprises:
   a fourth moving member movably supported by the base in a fourth direction; and
   a fifth moving member movably supported by the fourth moving member in a fifth direction intersecting with the fourth direction; and
   a sixth moving member movably supported by the fifth moving member in a sixth direction and connected to the conveyor, the sixth direction intersecting the fourth direction and the fifth direction.

15. The transfer apparatus according to claim 1, wherein the gripper includes a first surface, a second surface crossing the first surface, and suction pads provided at the first surface and the second surface.

16. A transfer apparatus, comprising:
   a gripper which grips an article;
   a first driving mechanism which linearly moves the gripper in at least two directions, the at least two directions including a first direction and a second direction intersecting with the first direction;

an elastic passive joint part which is interposed between the gripper and the first driving mechanism and operates in accordance with an operation of the gripper;

a conveyor which conveys the article;

a second driving mechanism which moves the conveyor, the second driving mechanism being connected to the conveyor; and a base which supports the first driving mechanism and the second driving mechanism, wherein the first driving mechanism comprises:

a first moving member linearly movably supported by the base in the first direction;

a second moving member linearly movably supported by the first moving member in the second direction and connected to the elastic passive joint part.

17. The transfer apparatus according to claim 16, wherein the second driving mechanism comprises:

a third moving member movably supported by the base in a third direction; and a fourth moving member movably supported by the third moving member in a fourth direction intersecting the third direction.

18. The transfer apparatus according to claim 16, wherein the first driving mechanism moves the gripper upward in a state where the gripper grips the article to make a gap on a lower side of the article, and the second driving mechanism moves the conveyor to insert a leading end of the conveyor into the gap.

19. The transfer apparatus according to claim 18, wherein the second driving mechanism linearly moves the conveyor in at least two directions, the at least two directions including a third direction and a fourth direction intersecting with the third direction.

20. The transfer apparatus according to claim 16, wherein the gripper includes a first surface, a second surface crossing the first surface, and suction pads provided at the first surface and the second surface.

* * * * *